US012421914B2

(12) United States Patent
Betchley et al.

(10) Patent No.: US 12,421,914 B2
(45) Date of Patent: Sep. 23, 2025

(54) COMPACT INFRARED SUPPRESSORS WITH RING VANES FOR GAS TURBINE ENGINES

(71) Applicant: Rolls-Royce North American Technologies Inc., Indianapolis, IN (US)

(72) Inventors: Curtlan C. Betchley, Indianapolis, IN (US); Kenneth M. Pesyna, Indianapolis, IN (US); Bryan H. Lerg, Indianapolis, IN (US); Steven T. Berenyi, Indianapolis, IN (US); Andrew M. Simonich, Indianapolis, IN (US); Victor L. Oechsle, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 18/972,575

(22) Filed: Dec. 6, 2024

(65) Prior Publication Data

US 2025/0101932 A1 Mar. 27, 2025

Related U.S. Application Data

(63) Continuation of application No. 18/371,810, filed on Sep. 22, 2023, now Pat. No. 12,180,910.

(51) Int. Cl.
*F02K 1/82* (2006.01)
(52) U.S. Cl.
CPC .................................. *F02K 1/825* (2013.01)

(58) Field of Classification Search
CPC ...... F02K 1/46; F02K 1/48; F02K 1/50; F02K 1/52; F02K 1/54; F02K 1/822; F02K 1/825; F02K 9/30; F02K 9/40
See application file for complete search history.

(56) References Cited

U.S. PATENT DOCUMENTS

| | | | |
|---|---|---|---|
| 3,048,376 A | 8/1962 | Howald | |
| 3,815,360 A | 6/1974 | Wellinitz | |
| 3,981,143 A * | 9/1976 | Ross | F02K 1/825 60/726 |
| 4,004,416 A * | 1/1977 | Amelio | F02K 1/825 239/265.17 |
| 4,136,518 A | 1/1979 | Hurley et al. | |
| 4,215,537 A | 8/1980 | Hurley | |
| 4,240,252 A | 12/1980 | Sargisson | |
| 4,501,393 A * | 2/1985 | Klees | F02K 1/1207 239/265.29 |
| 5,746,047 A | 5/1998 | Steyer et al. | |
| 7,607,306 B2 | 10/2009 | Steyer et al. | |
| 8,776,527 B1 | 7/2014 | Sokhey | |
| 10,494,116 B2 | 12/2019 | Petty et al. | |
| 10,507,930 B2 | 12/2019 | Keller | |
| 10,718,229 B2 | 7/2020 | Froemming | |

(Continued)

*Primary Examiner* — Thuyhang N Nguyen
(74) *Attorney, Agent, or Firm* — Barnes & Thornburg

(57) ABSTRACT

An infrared suppressor adapted for use with a gas turbine engine includes a first ring arranged circumferentially around a axis, a second ring arranged circumferentially around the axis, and a strut that extends radially between and interconnects the first ring and the second ring. A portion of the second ring extends radially toward the first ring such that the portion of the second ring cooperates with the first ring to block line-of-sight into the infrared suppressor.

14 Claims, 12 Drawing Sheets

(56) References Cited

U.S. PATENT DOCUMENTS

2010/0146980 A1* 6/2010 Strom .................... F02K 1/825
                                                           60/770
2018/0149114 A1  5/2018 Pantalone et al.

\* cited by examiner

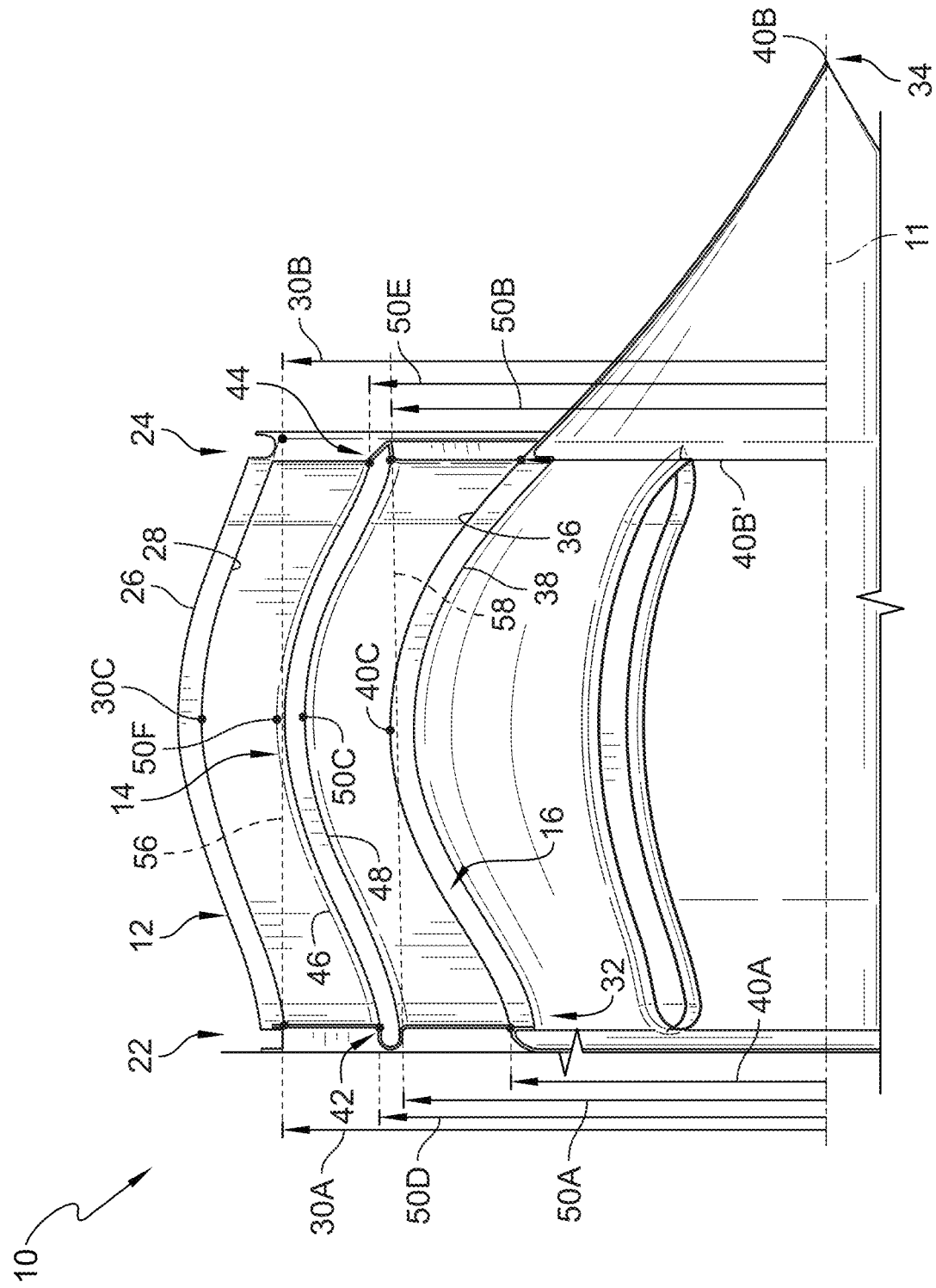

COMPACT INFRARED SUPPRESSORS WITH RING VANES FOR GAS TURBINE ENGINES

CROSS REFERENCE TO RELATED APPLICATIONS

This application claims priority to and the benefit of U.S. patent application Ser. No. 18/371,810, filed 22 Sep. 2023, the disclosure of which is now expressly incorporated herein by reference.

FIELD OF THE DISCLOSURE

The present disclosure relates generally to infrared suppressors for gas turbine engines, and more specifically to infrared suppressors having rings that cooperate to block line-of-sight into the suppressor.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Some gas turbine engines include infrared suppressors to reduce visibility of hot engine parts and hot exhaust gases to suppress infrared signature of the gas turbine engine. In some examples, infrared suppressors expand the flow area of hot exhaust gases out of the turbine using radial vanes. There remains interest in improved infrared suppression for gas turbine engines.

SUMMARY

The present disclosure may comprise one or more of the following features and combinations thereof.

An infrared suppressor adapted for use with a gas turbine engine may comprise an outer ring, an inner ring, and a first intermediate ring. The outer ring may be arranged circumferentially around a central axis to define an outer boundary of a flow path of the infrared suppressor. A radial inner surface of the outer ring may have a first curvilinear contour. The first curvilinear contour may be defined by a first diameter at a forward end of the outer ring, a second diameter at an aft end of the outer ring that is spaced apart axially from the forward end relative to the central axis, and a first radially maximum peak. The first radially maximum peak may be located axially between and radially outward of the first diameter and the second diameter of the outer ring relative to the central axis.

In some embodiments, the inner ring may be arranged circumferentially around the central axis. The inner ring may be aligned axially with the outer ring. The inner ring may be spaced apart radially from the outer ring to define an inner boundary of the flow path of the infrared suppressor.

In some embodiments, the first intermediate ring may be arranged circumferentially around the central axis. The first intermediate ring may be aligned axially with the outer ring and the inner ring. The first intermediate ring may be located radially between the outer ring and the inner ring to block line-of-sight through the infrared suppressor. A radial outer surface of the first intermediate ring may have a second curvilinear contour. The second curvilinear contour may be defined by a third diameter at a forward end of the first intermediate ring, a fourth diameter at an aft end of the first intermediate ring that is spaced apart axially from the forward end of the first intermediate ring relative to the central axis, and a second radially maximum peak. The second radially maximum peak may be located axially between and radially outward of the third diameter and the fourth diameter of the first intermediate ring relative to the central axis.

In some embodiments, an annular first imaginary surface may be defined between and interconnecting the first diameter and the second diameter of the outer ring. The annular first imaginary surface may have a constant slope relative to the central axis as it extends axially between the first diameter and the second diameter of the outer ring. The second radially maximum peak of the first intermediate ring may be located radially tangent with or radially outward of the first imaginary annular surface to block line-of-sight between the outer ring and the first intermediate ring and reduce infrared signature during the use of the infrared suppressor.

In some embodiments, a radial inner surface of the first intermediate ring may have a fifth diameter at the forward end of the first intermediate ring. The radial inner surface of the first intermediate ring may have a sixth diameter at the aft end of the first intermediate ring. The radial inner surface of the first intermediate ring may have a third radially maximum peak located axially between and radially outward of the fifth diameter and the sixth diameter of the first intermediate ring relative to the central axis.

In some embodiments, the inner ring may have a radial outer surface having a third curvilinear contour. The third curvilinear contour may be defined by a seventh diameter at a forward end of the inner ring, an eighth diameter at an aft end of the inner ring that is spaced apart axially from the forward end of the inner ring relative to the central axis, and a fourth radially maximum peak. The fourth radially maximum peak may be located axially between and radially outward of the seventh diameter and the eighth diameter of the inner ring relative to the central axis.

In some embodiments, an annular second imaginary surface may be defined between and interconnecting the fifth diameter and the sixth diameter of the first intermediate ring. The annular second imaginary surface may have a constant slope relative to the central axis as it extends axially between the fifth diameter and the sixth diameter. The fourth radially maximum peak of the inner ring may be located radially tangent with or radially outward of the annular second imaginary surface to block line-of-sight between the first intermediate ring and the inner ring and reduce infrared signature during the use of the infrared suppressor.

In some embodiments, a radial inner surface of the first intermediate ring may have a fifth diameter at the forward end of the first intermediate ring. The radial inner surface of the first intermediate ring may have a sixth diameter at the aft end of the first intermediate ring. A third radially maximum peak may be located axially between and radially outward of the fifth diameter and the sixth diameter of the first intermediate ring relative to the central axis.

In some embodiments, the infrared suppressor may include a second intermediate ring located radially between and axially aligned with the first intermediate ring and the inner ring. The second intermediate ring may have a radial outer surface having a third curvilinear contour. The third curvilinear contour may be defined by a seventh diameter at a forward end of the second intermediate ring, an eighth diameter at an aft end of the second intermediate ring that is spaced apart axially from the forward end of the second intermediate ring relative to the central axis, and a fourth radially maximum peak. The fourth radially maximum peak may be located axially between and radially outward of the seventh diameter and the eighth diameter of the second intermediate ring relative to the central axis.

In some embodiments, an annular second imaginary surface may be defined between and interconnecting the fifth diameter and the sixth diameter of the first intermediate ring. The annular second imaginary surface may have a constant slope relative to the central axis as it extends axially between the fifth diameter and the sixth diameter. The fourth radially maximum peak of the second intermediate ring may be located radially tangent with or radially outward of the annular second imaginary surface to block line-of-sight between the first intermediate ring and the second intermediate ring and reduce infrared signature during the use of the infrared suppressor.

In some embodiments, the aft end of the first intermediate ring may be spaced apart axially aft of the aft end of the outer ring. The infrared suppressor may comprise a housing arranged circumferentially around the outer ring. The housing may extend axially aft beyond the aft end of the outer ring and the aft end of the first intermediate ring. The housing may be formed to define an air passage that extends radially and axially through the housing along a portion of the outer ring and directs air into the flow path of the infrared suppressor.

In some embodiments, the infrared suppressor may comprise a first strut that extends radially between and interconnects the outer ring and the first intermediate ring. The first intermediate ring may be formed to define a cooling cavity therein. The first strut may define a cooling passage that extends radially into the first strut. The cooling passage may be fluidly connected with the cooling cavity to direct fluid into the cooling cavity and cool the first intermediate ring.

In some embodiments, the first intermediate ring may be formed to define a plurality of outlet holes that are in fluid communication with the cooling cavity and discharge the fluid out of the cooling cavity into the flow path. The first strut may extend radially at a canted angle relative to the central axis such that the canted angle does not intersect the central axis.

In some embodiments, the infrared suppressor may comprise a second strut that extends radially between and interconnects the inner ring and the first intermediate ring. The first strut may be offset circumferentially from the second strut such that no strut extending between the inner ring and the first intermediate ring is aligned circumferentially with the first strut and no strut extending between the outer ring and the first intermediate ring is aligned circumferentially with the second strut.

According to another aspect of the present disclosure, an infrared suppressor adapted for use with a gas turbine engine may comprise a first ring and a second ring. The first ring may be arranged circumferentially around a central axis. The first ring may have a forward end of the first ring, an aft end of the first ring that is spaced apart axially from the forward end of the first ring relative to the central axis, and a first radial extreme. The first radial extreme may be located axially between the forward end of the first ring and the aft end of the first ring relative to the central axis. The second ring may be arranged circumferentially around the central axis and aligned axially with the first ring. The second ring may have a forward end of the second ring, an aft end of the second ring that is spaced apart axially from the forward end of the second ring relative to the central axis, and a second radial extreme. The second radial extreme may be located axially between the forward end of the second ring and the aft end of the second ring relative to the central axis.

In some embodiments, the second radial extreme of the second ring may extend radially away from the forward end and the aft end of the second ring and toward the first ring such that the second radial extreme is tangential to or extends radially beyond an imaginary surface that extends, at a constant slope, axially between and interconnects the forward end and the aft end of the first ring. The first ring may be located radially outward of the second ring. The first radial extreme may be a radial maximum height of the first ring. The second radial extreme may be a radial maximum height of the second ring.

In some embodiments, the second ring may be located radially outward of the first ring. The first radial extreme may be a radial minimum height of the first ring. The second radial extreme may be a radial minimum height of the second ring.

In some embodiments, the infrared suppressor may comprise a first strut that extends radially between and interconnects the first ring and the second ring. The second ring may be formed to define a cooling cavity therein. The first strut may define a cooling passage that extends radially into the first strut and is fluidly connected with the cooling cavity of the second ring.

In some embodiments, the first strut may extend radially at a canted angle relative to the central axis such that the canted angle does not intersect the central axis. The second ring may be formed to define a cooling cavity therein and a plurality of outlet holes that are in fluid communication with the cooling cavity and discharge fluid out of the cooling cavity into a flow path of the infrared suppressor during operation of the infrared suppressor.

In some embodiments, the infrared suppressor may comprise a housing arranged circumferentially around the first ring and the second ring. The housing may extend axially aft beyond the aft end of the first ring and the aft end of the second ring. The housing may be formed to define an air passage that extends radially and axially through the housing to direct air into a flow path of gases exiting between the first ring and the second ring.

A method of providing an infrared suppressor may comprise providing a first ring arranged circumferentially around a central axis. The first ring may have a forward end of the first ring, an aft end of the first ring that is spaced apart axially from the forward end of the first ring relative to the central axis, and a first radial extreme. The first radial extreme may be located axially between and radially spaced apart from the forward end of the first ring and the aft end of the first ring relative to the central axis.

In some embodiments, the method may comprise providing a second ring axially aligned with the first ring. The second ring may be arranged circumferentially around the central axis. The second ring may have a forward end of the second ring, an aft end of the second ring that is spaced apart axially from the forward end of the second ring relative to the central axis, and a second radial extreme. The second radial extreme may be located axially between and radially spaced apart from the forward end of the second ring and the aft end of the second ring relative to the central axis.

In some embodiments, the method may comprise coupling the first ring and the second ring together with a strut that extends radially between and interconnects the first ring and the second ring. The second radial extreme of the second ring may extend radially away from the forward end and the aft end of the second ring and toward the first ring such that the second radial extreme is tangential to or extends radially beyond an imaginary surface that extends, at a constant slope, axially between and interconnects the forward end and the aft end of the first ring. The second radial extreme may be located radially between a radius of the forward end of the first ring and a radius of the aft end of the first ring.

These and other features of the present disclosure will become more apparent from the following description of the illustrative embodiments.

BRIEF DESCRIPTION OF THE DRAWINGS

FIG. 3A is an enlarged section view of the infrared suppressor of FIG. 2 showing each ring is curvilinear and suggesting that a radially maximum peak of the intermediate ring extends outward to be at least tangent with an imaginary surface between a forward end and an aft end of the outer ring and a radially maximum peak of the inner ring extends outward to be at least tangent with an imaginary surface that extends axially between a forward end and an aft end of the intermediate ring to block line-of-sight through the infrared suppressor;

DETAILED DESCRIPTION

Figure 1:
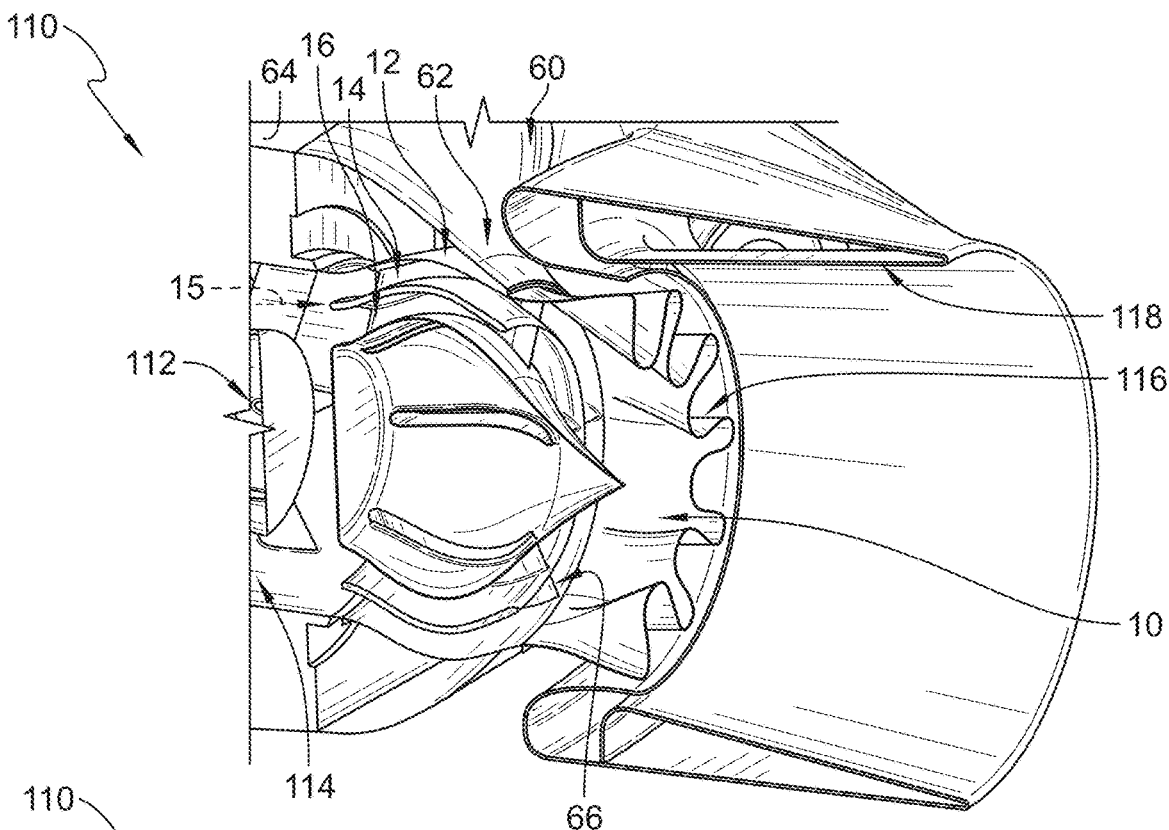
FIG. 1 is a cutaway perspective view of a portion of a gas turbine engine having an engine core and an infrared suppressor coupled to an aft end of the engine core, the infrared suppressor including an outer ring, an intermediate ring, and an inner ring that cooperate to block line-of-sight through the infrared suppressor to a turbine section of the engine core to reduce an infrared signature of the gas turbine engine.

For the purposes of promoting an understanding of the principles of the disclosure, reference will now be made to a number of illustrative embodiments illustrated in the drawings and specific language will be used to describe the same.

FIGS. 1-17 show embodiments of infrared suppressors 10, 210, 310, 410 adapted for use with a gas turbine engine 110. The infrared suppressors 10, 210, 310, 410 include circumferentially extending rings that cooperate to block line-of-sight through the infrared suppressors 10, 210, 310, 410 to reduce an infrared signature a gas turbine engine 110 during the use of the gas turbine engine 110 and the infrared suppressor 10. In some embodiments, the rings cooperate to block line-of-sight for all aft-looking-fore viewing angles of the gas turbine engine 110.

Blocking line-of-sight to the hot turbine exit of the gas turbine engine 110 may be beneficial for infrared suppression. The infrared suppressors 10, 210, 310, 410 of the present disclosure include one or more rings (annular) (sometimes vane shaped) in the core flow having, for example, an S shape or goose neck shape in axial cross section, along with an inner ring (depicted as a center-body and/or tail-cone in the illustrative embodiments) to provide line-of-sight blockage to the turbine exit hot parts. The annular vane ring(s) and center-body/tail-cone are mechanically supported by three or more radial struts in illustrative embodiments.

The visible surfaces of the rings may be cooled to suppress infrared emissions by using directional effusion cooling holes or slots that film cool the visible surfaces with colder air from one or more of engine bay purge air, engine bypass air, entrained ambient air, etc. The illustrative gas turbine engine 110 further includes a lobe mixer 116 to mix cold air with the hot exhaust to suppress infrared plume radiation and a diffuser 118 which may help the exhaust of the turbine section merge efficiently with the ambient air stream. The diffuser 118 may further aid in the line of sight blockage of hot parts of the gas turbine engine 110 and the suppressors.

Figure 14:
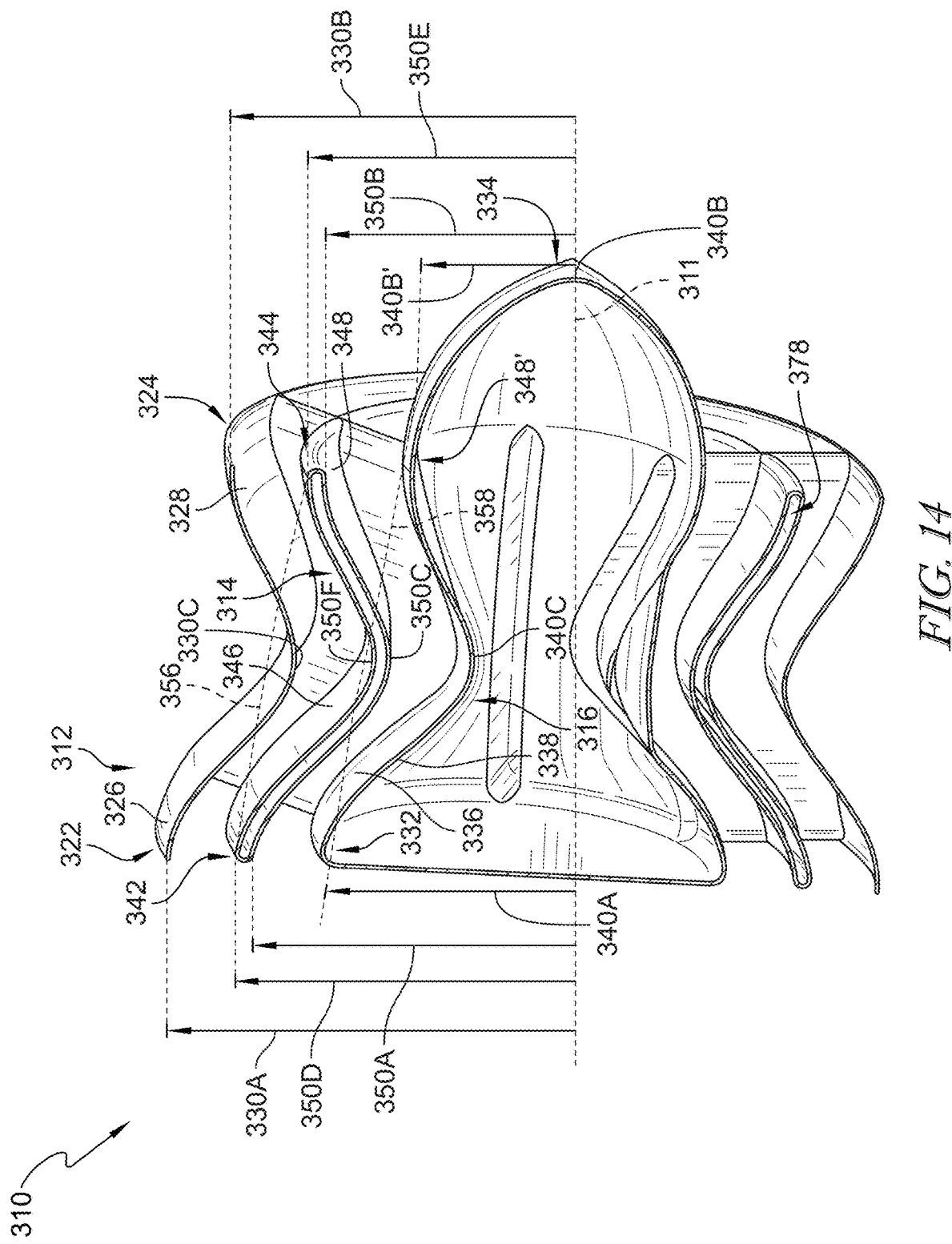
FIG. 14 is a cutaway perspective view of a gas turbine engine having another embodiment of an infrared suppressor including an outer ring, an intermediate ring, and an inner ring that cooperate to block line-of-sight through the infrared suppressor to reduce an infrared signature of the gas turbine engine, each ring is curved radially inward so that each ring has a radially minimum trough, and further showing that the intermediate ring is hollow to define a cooling cavity between a radial outer surface and a radial inner surface of the intermediate ring.
Figure 15:
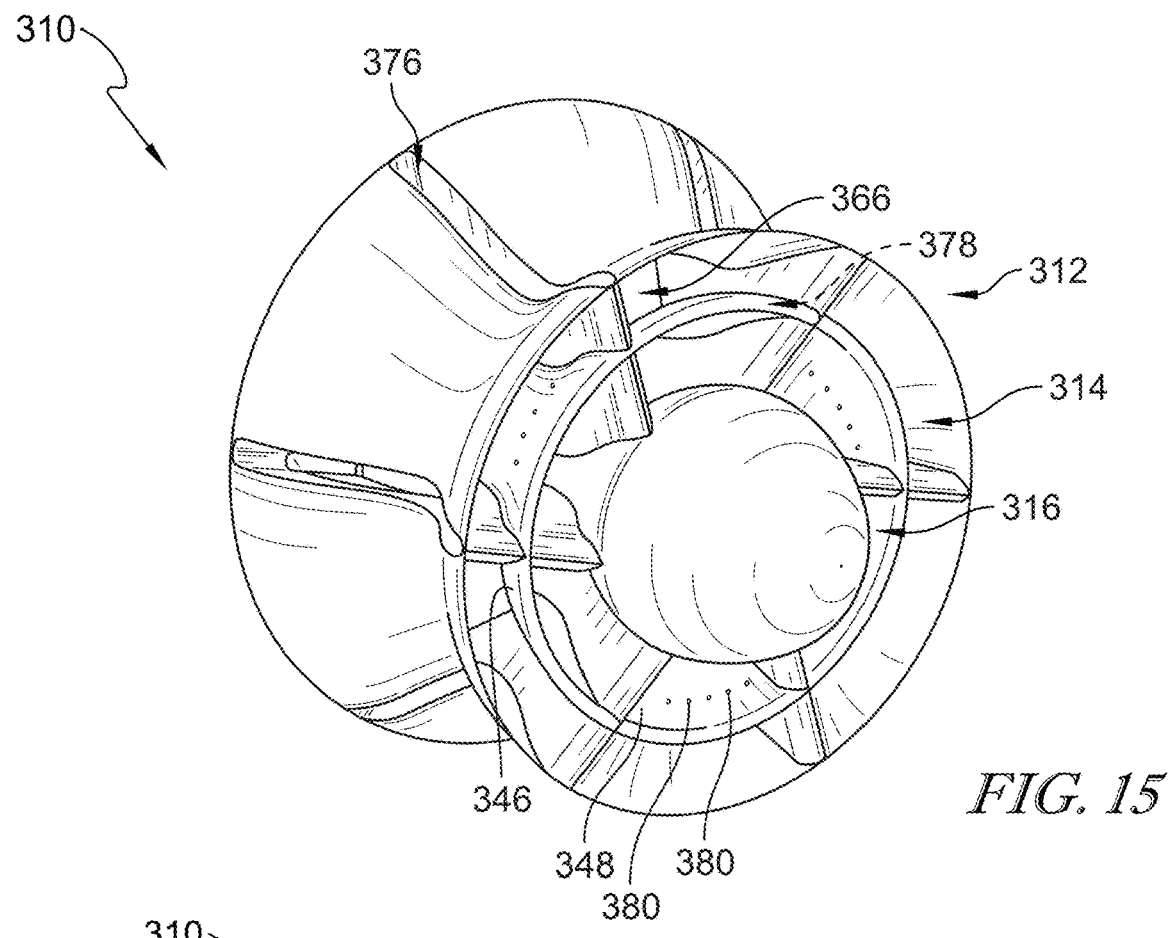
FIG. 15 is a perspective view of the infrared suppressor of FIG. 14 showing that a plurality of struts extend radially between the outer ring, the intermediate ring, and the inner ring to support the rings relative to one another and to carry fluid through a cooling passage formed in each strut to the rings, and further showing that the radial outer surface and the radial inner surface of the intermediate ring are each formed to include a plurality of outlet holes to direct fluid out of the cooling cavity of the intermediate ring to cool the rings.
Figure 16:
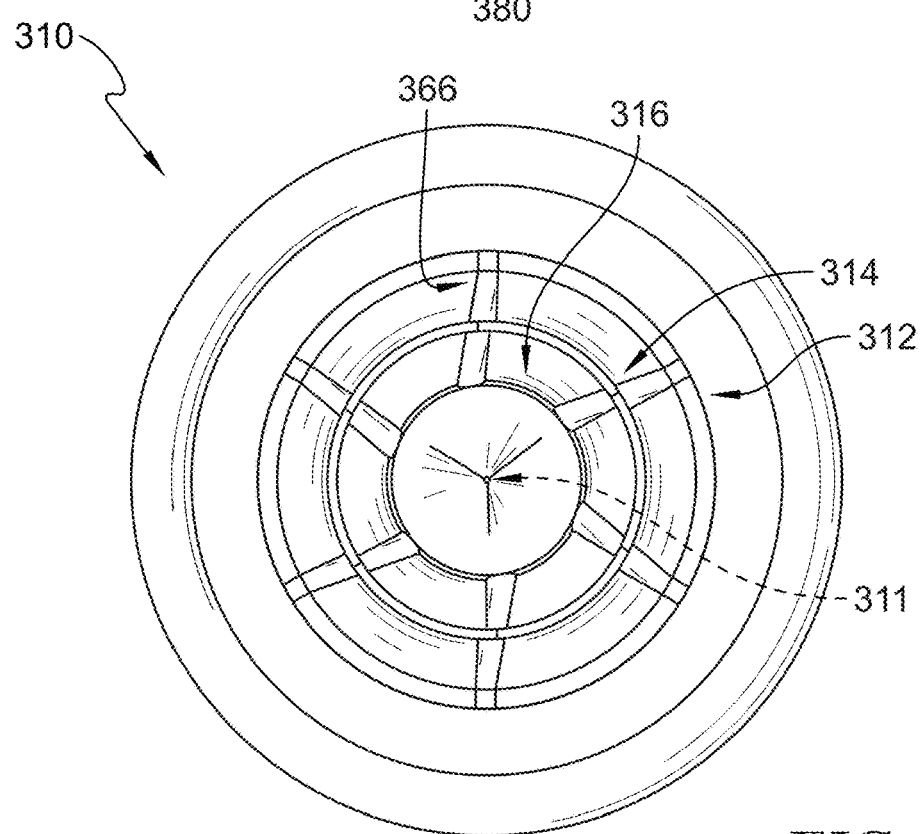
FIG. 16 is a view of the infrared suppressor of FIG. 14 looking axially forward at the infrared suppressor showing that the plurality of struts extend between and couple the outer ring, the intermediate ring, and the inner ring, and further showing that each of the plurality of struts extends at a canted angle relative to a central axis to reduce mechanical stress on the rings.
Figure 17:
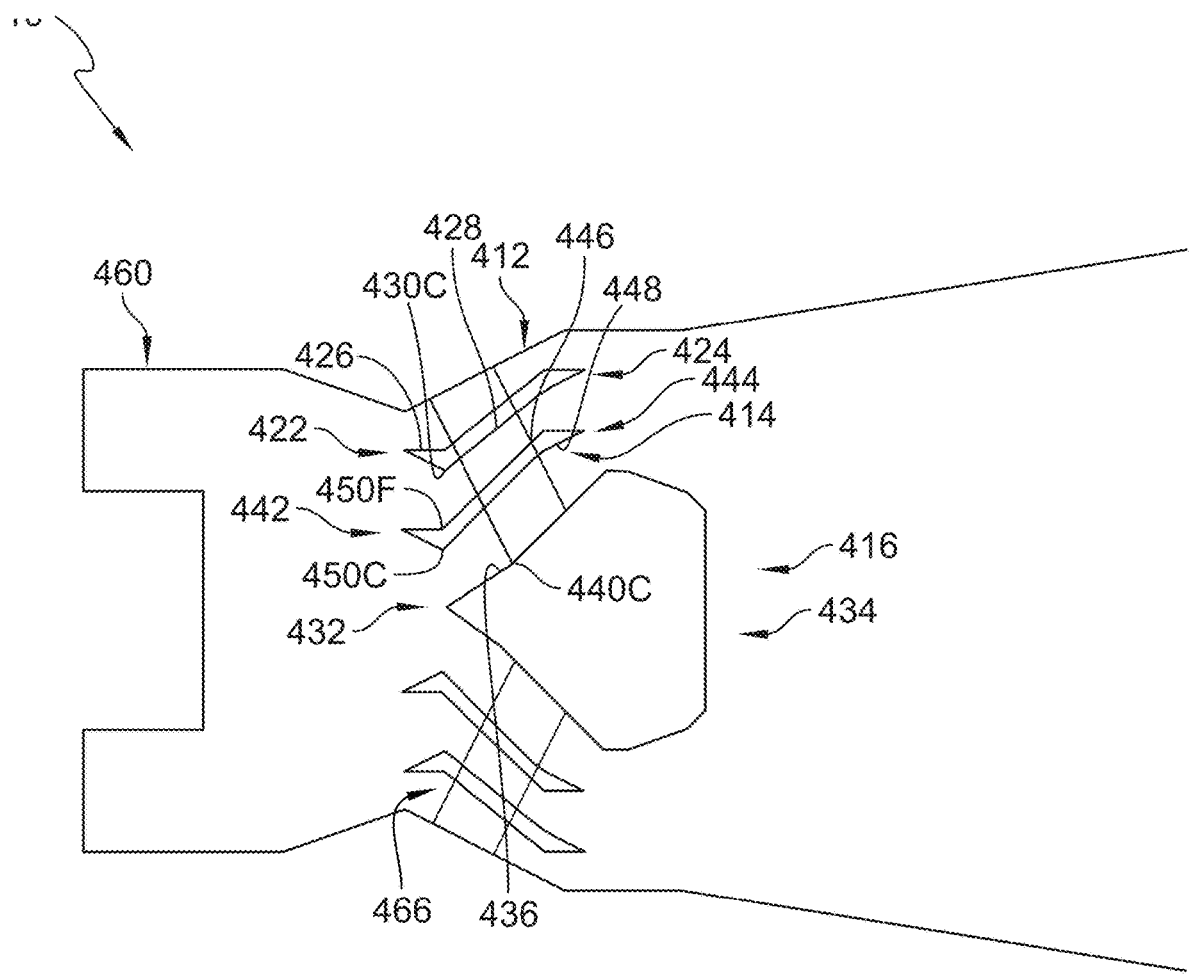
FIG. 17 is a diagrammatic view of a gas turbine engine having another embodiment of an infrared suppressor including an outer ring, intermediate rings, and an inner ring that cooperate to block line-of-sight through the infrared suppressor to reduce an infrared signature of the gas turbine engine.

FIGS. 1-8 show an embodiment of one of the infrared suppressors 10. The infrared suppressor 10 includes a plurality of rings 12, 14, 16 arranged circumferentially around a central axis 11. The rings 12, 14, 16 cooperate to block line-of-sight 17 through the infrared suppressor 10 to reduce the infrared signature of the gas turbine engine 110 during the use of the gas turbine engine 110 and the infrared suppressor 10. FIG. 9 shows the infrared suppressor 10 with an additional ring 88 which may reduce the radial height of each of the rings 12, 14, 16, 88 for the given flow path. FIGS. 10-13 show an embodiment of an infrared suppressor 210 having an axially elongated ring 214. FIGS. 14-16 shown an embodiment of an infrared suppressor 310 having radially inward curving rings 312, 314, 316. FIG. 17 shows another embodiment of an infrared suppressor 410 with rings 412, 414, 416.

The gas turbine engine 110 includes a fan and an engine core 112. The engine core 112 includes a compressor, a combustor located downstream of the compressor, and a turbine 114 located downstream of the combustor. The fan is driven by and coupled to the turbine 114 and rotates about the central axis 11 to force air through a flow path arranged around the engine core so that the air is directed through a bypass duct to provide thrust to propel the gas turbine engine 110. The compressor compresses and delivers air to the combustor. The combustor mixes fuel with the compressed air received from the compressor and ignites the fuel. The hot, high-pressure products of the combustion reaction in the combustor are directed into the turbine 114 to cause the turbine 114 to rotate about the central axis 11 and drive the compressor and the fan. In some embodiments, the fan is omitted and the thrust from the turbine section propels the aircraft.

The infrared suppressor 10 is coupled to the engine core 112 downstream of the turbine 114 to reduce the infrared signature of the gas turbine engine 110. The infrared suppressor 10 includes an outer ring 12, a first intermediate ring 14, and an inner ring 16 (a tailcone in the illustrative embodiments) in the illustrative embodiment shown in FIGS. 1-9. The outer ring 12 and the first intermediate ring 14 are shaped to block line-of-sight 17 between the two rings 12, 14 when viewing the infrared suppressor 10 axially aft looking forward (from a range of or from all vertical positions). Similarly, the inner ring 16 and the first intermediate ring 14 are shaped to block line-of-sight 17 between the two rings 16, 14 when viewing the infrared suppressor 10 axially aft looking forward (from a range of or from all vertical positions). In some embodiments, the infrared suppressor 10 includes one or more additional intermediate rings, as shown in FIG. 9.

Figure 2:
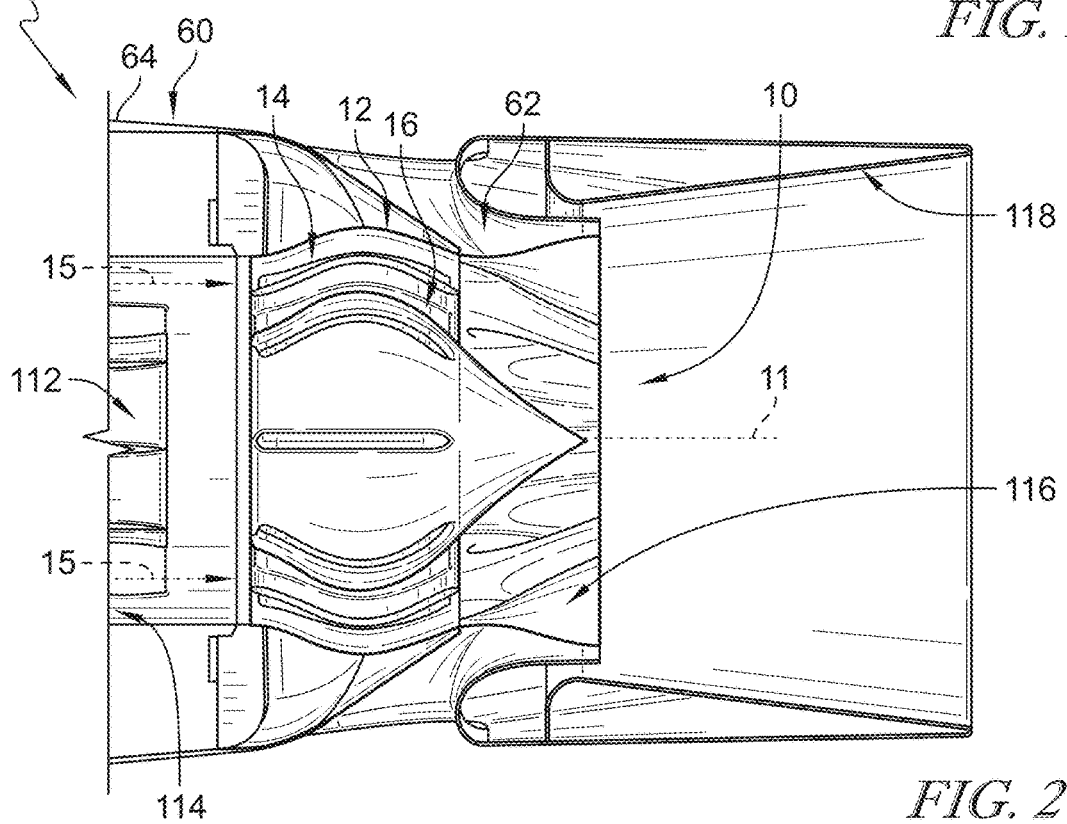
FIG. 2 is a cutaway view of the gas turbine engine of FIG. 1 suggesting the inner ring extends circumferentially around a central axis and is formed as a tail cone for the gas turbine engine, the intermediate ring extends circumferentially around the central axis radially outward of the inner ring, and the outer ring extends circumferentially around the central axis radially outward of the intermediate ring.

The outer ring 12 is arranged circumferentially around the central axis 11 as shown in FIGS. 1-4. The outer ring 12 is provided by a housing and defines an outer boundary of a flow path 15 of the infrared suppressor 10 as shown in FIGS. 1-3. The outer ring 12 includes a radial inner surface 28 that extends along a first curvilinear path from a forward end 22 to an aft end 24 thereof that is spaced apart axially from the forward end 22 as shown in FIG. 3A. The outer ring 12 includes a radial outer surface 26 and the radial inner surface 28 that defines the outer boundary of the flow path 15. The radial outer surface 26 is exposed to bypass air from the fan in the illustrative embodiment.

The radial inner surface 28 of the outer ring 12 has a first curvilinear contour defined by a first diameter 30A at the forward end 22 of the outer ring 12, a second diameter 30B at the aft end 24 of the outer ring 12, and a first radial extreme 30C as shown in FIG. 3A. The first radial extreme 30C is located axially between and radially away from the first diameter 30A and the second diameter 30B relative to the central axis 11. In other embodiments, the first radial extreme 30C may be located at the forward end 22 and/or the aft end 24.

In the illustrative embodiment, the first radial extreme 30C is a radially maximum peak 30C, the first diameter 30A is minimum diameter of the outer ring 12 forward of the first radially maximum peak 30C, and the second diameter 30B is a minimum diameter of the outer ring 12 aft of the first radially maximum peak 30C as shown in FIG. 3A. In other embodiments, the first radial extreme is a radially minimum trough, the first diameter is a maximum diameter of the outer ring forward of the first radially minimum trough, and the second diameter is a maximum diameter of the outer ring aft of the first radially minimum trough as shown in FIGS. 14-16.

Figure 3B:
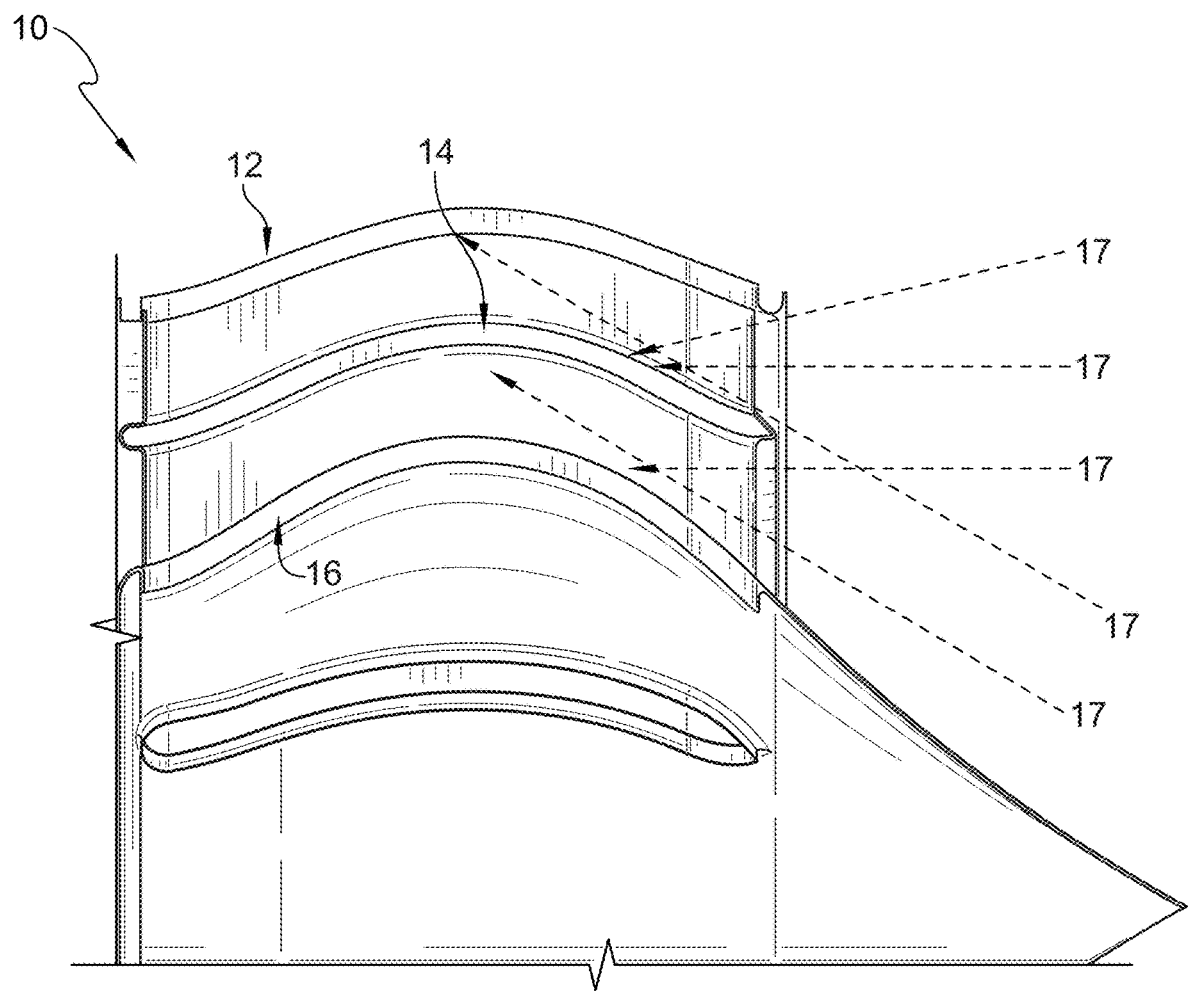
FIG. 3B is a section view of the infrared suppressor similar to FIG. 2 showing the curved rings of the infrared suppressor cooperate to block line-of-sight through the infrared suppressor for any angle of view when looking axially forward at the infrared suppressor at a plurality of heights relative to the infrared suppressor.
Figure 4:
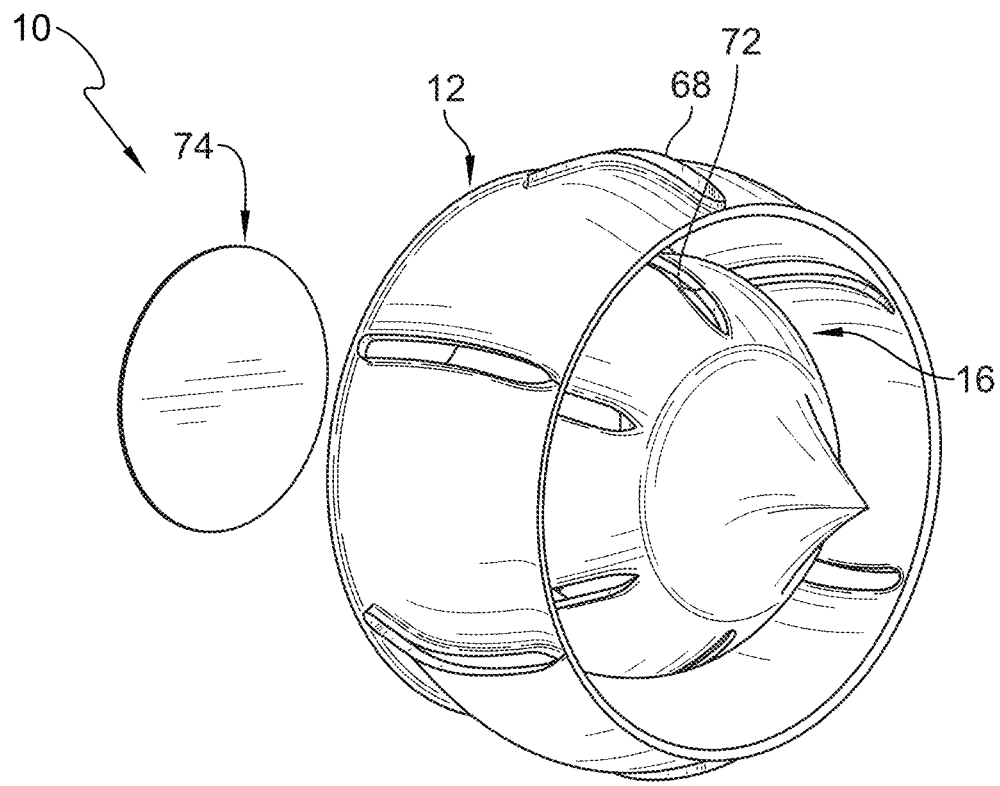
FIG. 4 is a perspective view of a portion of the infrared suppressor of FIG. 1 showing the inner ring is located radially inward of the outer ring, each of the outer ring and the inner ring are formed to include strut passages that each receive a strut therein, and the infrared suppressor includes an endcap configured to fit with and close off a forward end of the inner ring.

The inner ring 16 is arranged circumferentially around the central axis 11 as shown in FIGS. 1-4. The inner ring 16 is spaced apart radially from the outer ring 12 and defines an inner boundary of the flow path 15 of the infrared suppressor 10 as shown in FIGS. 1-3. The inner ring 16 extends along a second curvilinear path from a forward end 32 to an aft end 34 thereof that is spaced apart axially from the forward end 32 as shown in FIG. 3A. The inner ring 16 includes a radial inner surface 38 and a radial outer surface 36 that defines the inner boundary of the flow path 15. The inner ring 16 is formed as a tail cone for the gas turbine engine 110 as shown in FIG. 4.

The radial outer surface 36 of the inner ring 16 has a second curvilinear contour defined by a first diameter 40A at the forward end 32 of the inner ring 16, a second diameter 40B at the aft end 34, and a second radial extreme 40C. The second radial extreme 40C is located axially between and radially away from the first diameter 40A and the second diameter 40B relative to the central axis 11. In other embodiments, the second radial extreme 40C is located at the forward end 32 and/or the aft end 34.

In the illustrative embodiment, the second radial extreme 40C is a radially maximum peak 40C of the radial outer surface 36, the first diameter 40A is a minimum diameter of the inner ring 16 forward of the second radially maximum peak 40C, and the second diameter 40B is a minimum diameter of the inner ring 16 aft of the second radially maximum peak 40C as shown in FIG. 3A. In the illustrative embodiment, the inner ring 16 is the tail cone and, thus, the second diameter 40B is equal to about zero and the aft end 34 is the tip of the tail cone.

In other embodiments, the aft end 34 may be located generally axially aligned with the aft end 24 of the outer ring 12 and the second diameter 40B may be greater than zero as suggested by second diameter 40B' in FIG. 3A. In other embodiments, the second radial extreme is a radially minimum trough, the first diameter of the inner ring is a maximum diameter of the inner ring forward of the second radially minimum trough, and the second diameter of the inner ring is a maximum diameter of the inner ring aft of the second radially minimum trough as shown in FIGS. 14-16.

The first intermediate ring 14 is arranged circumferentially around the central axis 11 as shown in FIGS. 1-4. The first intermediate ring 14 is spaced apart radially from the outer ring 12 and the inner ring 16 as shown in FIGS. 1-3. The first intermediate ring 14 is located radially between the outer ring 12 and the inner ring 16. The first intermediate ring 14 extends along a third curvilinear path from a forward end 42 to an aft end 44 thereof that is spaced apart axially from the forward end 42 as shown in FIG. 3A. In the illustrative embodiment, the aft end 24 of the outer ring 12 and the aft end 44 of the first intermediate ring 14 are generally axially aligned as shown in FIG. 3A. The first intermediate ring 14 includes a radial outer surface 46 and a radial inner surface 48.

The radial inner surface 48 of the first intermediate ring 14 has a third curvilinear contour defined by a first diameter 50A at the forward end 42 of the first intermediate ring 14, a second diameter 50B at the aft end 44, and a third radial extreme 50C. The third radial extreme 50C is located axially between and radially away from the first diameter 50A and the second diameter 50B of the first intermediate ring 14 relative to the central axis 11. In other embodiments, the third radial extreme 50C is located at the forward end 42 and/or the aft end 44.

In the illustrative embodiment, the third radial extreme 50C is a radially maximum peak 50C of the radial inner surface 48, the first diameter 50A is a minimum diameter of the radial inner surface 48 of the first intermediate ring 14 forward of the third radially maximum peak 50C, and the second diameter 50B is a minimum diameter of the radial inner surface 48 of the first intermediate ring 14 aft of the third radially maximum peak 50C as shown in FIG. 3A. In other embodiments, the third radial extreme is a radially minimum trough, the first diameter of the first intermediate ring is a maximum diameter of the first intermediate ring forward of the radially minimum trough, and the second diameter of the first intermediate ring is a maximum diameter of the first intermediate ring aft of the second radially minimum trough as shown in FIGS. 14-16.

The radial outer surface 46 of the first intermediate ring 14 has a fourth curvilinear contour defined by a third diameter 50D at the forward end 42 of the first intermediate ring 14, a fourth diameter 50E at the aft end 44, and a fourth radial extreme 50F. The fourth radial extreme 50F is located axially between and radially away from the third diameter 50D and the fourth diameter 50E of the first intermediate ring 14 relative to the central axis 11.

In the illustrative embodiment, the fourth radial extreme 50F is a radially maximum peak 50F of the radial outer surface 46, the third diameter 50D is a minimum diameter of the radial outer surface 46 of the first intermediate ring 14 forward of the fourth radially maximum peak 50F, and the fourth diameter 50E is a minimum diameter of the radial outer surface 46 of the first intermediate ring 14 aft of the fourth radially maximum peak 50F as shown in FIG. 3A. In other embodiments, the fourth radial extreme is a radially minimum trough, the third diameter of the first intermediate ring is a maximum diameter of the first intermediate ring forward of the fourth radially minimum trough, and the fourth diameter of the first intermediate ring is a maximum diameter of the first intermediate ring aft of the fourth radially minimum trough as shown in FIGS. 14-16.

Because of the radially outwardly curving rings 12, 14, 16, air flowing through the flow path 15 of the infrared suppressor 10 follows the curvature of the rings 12, 14, 16 as the air flows through the flow path 15. Generally, some infrared suppressors include radial S-shaped vanes (arranged like spokes) so that air flowing through the infrared suppressor has momentum changes about two separate axes. The radially outwardly curving rings 12, 14, 16 create the flow path 15 so that air flowing through the flow path 15 has momentum changes about a single axis as the air flows over the curves of the rings 12, 14, 16. Thus, the air flowing through the flow path 15 may undergo less turn losses.

Figure 6:
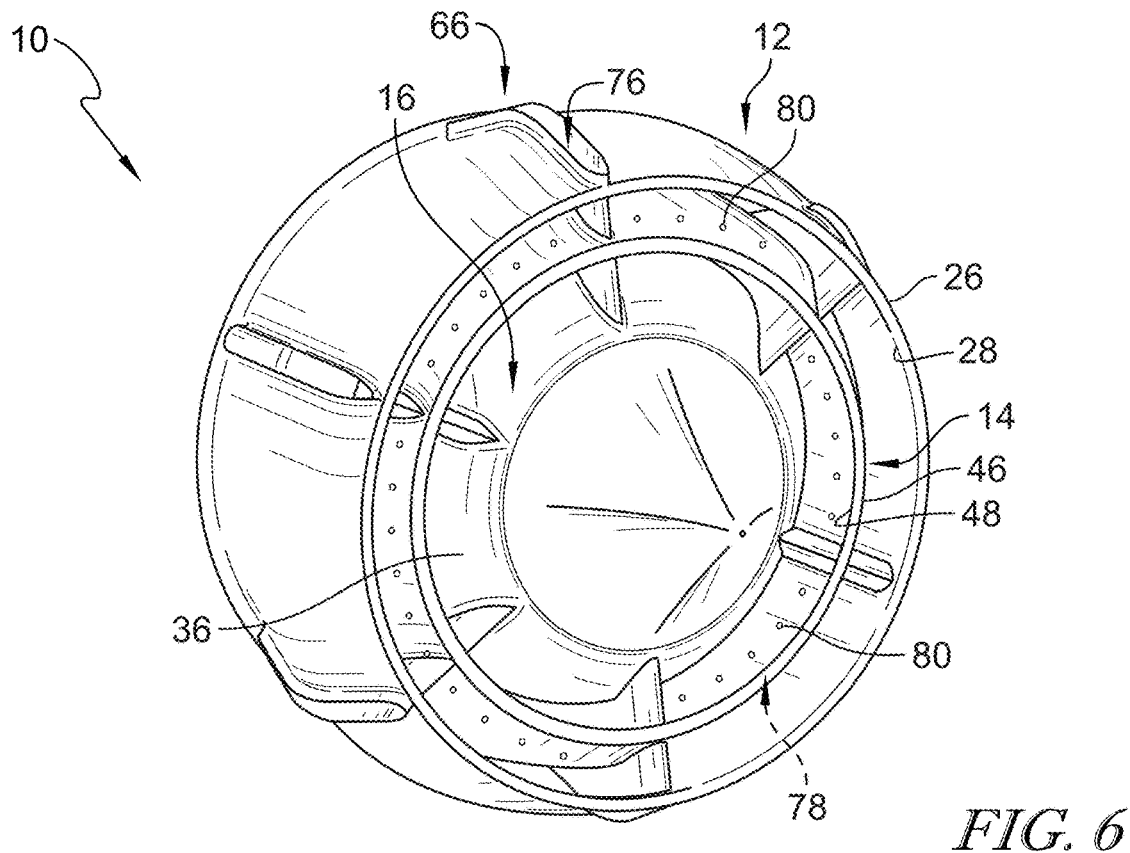
FIG. 6 is a perspective view of the infrared suppressor of FIG. 1 showing the struts extending radially between the rings to support the rings, and further showing that a radial outer surface and a radial inner surface of the intermediate ring is formed to include a plurality of outlet holes in fluid communication with the cooling passage formed in each strut to direct the fluid toward the rings to cool the infrared suppressor.
Figure 7:
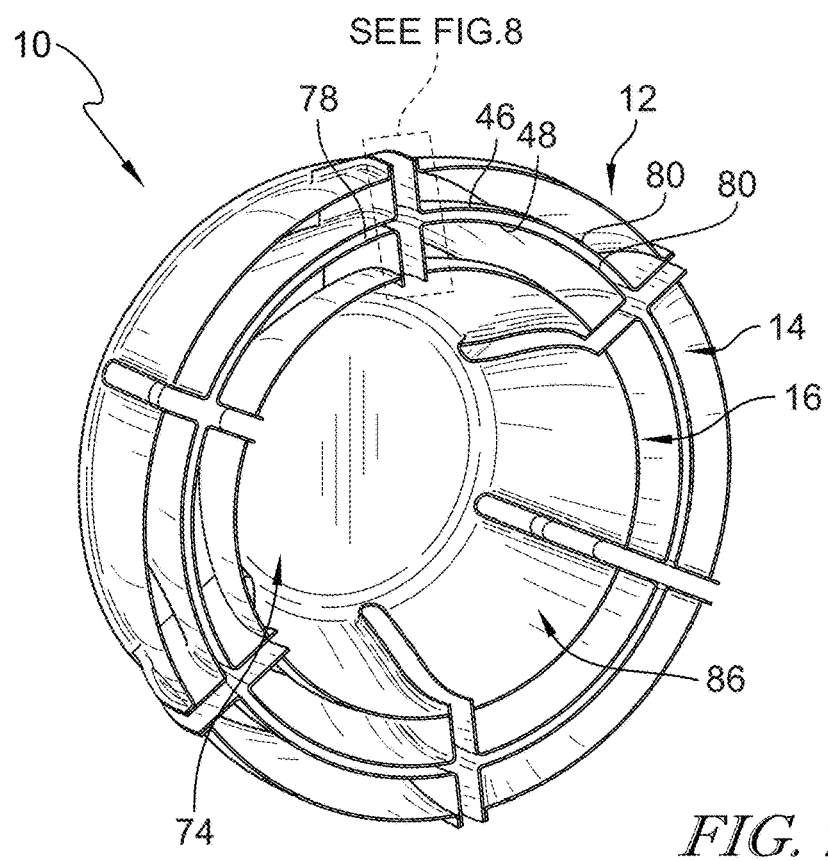
FIG. 7 is a cutaway perspective view of the infrared suppressor of FIG. 6 showing that the intermediate ring is hollow and formed to define a cooling cavity radially between the radial outer surface and the radial inner surface so that at least some fluid is directed from the cooling passage formed in each strut, into the cooling cavity of the intermediate ring, and out of the plurality of outlet holes formed in the surfaces of the intermediate ring to cool the rings of the infrared suppressor.

The rings 12, 14, 16 each have radial thicknesses as suggested in FIG. 3A. In the illustrative embodiment, the first intermediate ring 14 is formed to define a cooling cavity 78 therein as shown in FIGS. 6 and 7. In some embodiments, the outer ring 12 and the inner ring 16 are formed with cooling cavities therein. In some embodiments, one or more of the rings 12, 14, 16 have a relatively thin radial thickness such that the diameters, peaks, and troughs of the outer surfaces of the rings 12, 14, 16 are substantially equivalent to those of the inner surfaces of the rings 12, 14, 16 for purposes of measuring distances for blocking line-of-sight 17 through the infrared suppressor 10. In some embodiments, the infrared suppressor 10, including the rings 12, 14, 16, may be 3D-printed as a single (and integral) or multi-component build.

The first intermediate ring 14 is located radially between the outer ring 12 and the inner ring 16 to block line-of-sight 17 through the infrared suppressor 10 as suggested in FIGS. 1 and 2. In particular, a portion of the first intermediate ring 14 is tangent with or overlaps (when viewed axially) portions of the outer ring 12, and a portion of the inner ring 16 is tangent with or overlaps (when viewed axially) portions of the first intermediate ring 14.

Referring to FIG. 3A, an annular first imaginary surface 56 is defined between and interconnects the first diameter 30A and the second diameter 30B of the outer ring 12. The annular first imaginary surface 56 has a constant slope relative to the central axis 11 as it extends axially between the first diameter 30A and the second diameter 30B of the outer ring 12. The fourth radially maximum peak 50F of the radial outer surface 46 of the first intermediate ring 14 is located radially tangent with or radially outward of the annular first imaginary surface 56 to block line-of-sight 17 between the outer ring 12 and the first intermediate ring 14 and reduce infrared signature during the use of the infrared suppressor 10. In the illustrative embodiment, the annular first imaginary surface 56 is generally parallel with the axis 11; however, it should be appreciated that any suitable angle relative to the axis 11 may be used, with positive or negative slope.

Locating the fourth radially maximum peak 50F of the radial outer surface 46 of the first intermediate ring 14 radially tangent with or radially outward of the annular first imaginary surface 56 block line-of-sight 17 between the outer ring 12 and the first intermediate ring 14 for a range of or for all vertical locations as shown in FIG. 3B. In the illustrative embodiment, the fourth radially maximum peak 50F of the radial outer surface 46 of the first intermediate ring 14 is tangent with the annular first imaginary surface 56. In other embodiments, the fourth radially maximum peak 50F of the radial outer surface 46 of the first intermediate ring 14 extends radially outward and beyond the annular first imaginary surface 56.

Referring to FIG. 3A, an annular second imaginary surface 58 is defined between and interconnects the first diameter 50A and the second diameter 50B of the first intermediate ring 14. The annular second imaginary surface 58 has a constant slope relative to the central axis 11 as it extends axially between the first diameter 50A and the second diameter 50B of the first intermediate ring 14. The second radially maximum peak 40C of the radial outer surface 36 of the inner ring 16 is located radially tangent with or radially outward of the annular second imaginary surface 58 to block line-of-sight 17 between the first intermediate ring 14 and the inner ring 16 and reduce infrared signature during the use of the infrared suppressor 10. In the illustrative embodiment, the annular second imaginary surface 58 is generally parallel with the axis 11; however, it should be appreciated that any suitable angle relative to the axis 11 may be used, with positive or negative slope.

Locating the second radially maximum peak 40C of the radial outer surface 36 of the inner ring 16 radially tangent with or radially outward of the annular second imaginary surface 58 may block line-of-sight 17 between the first intermediate ring 14 and the inner ring 16 for a range of or all vertical locations as shown in FIG. 3B. In the illustrative embodiment, the second radially maximum peak 40C of the radial outer surface 36 of the inner ring 16 is tangent with the annular second imaginary surface 58. In other embodiments, the second radially maximum peak 40C of the radial outer surface 36 of the inner ring 16 extends radially outward and beyond the annular second imaginary surface 58.

The infrared suppressor 10 includes a housing 60 arranged circumferentially around the outer ring 12, as shown in FIGS. 1 and 2, and an endcap 74 located at the forward end 32 of the inner ring 16, as shown in FIG. 4. The housing 60 extends axially aft beyond the aft end 24 of the outer ring 12 and the aft end 44 of the first intermediate ring 14. The housing 60 may be integral with the outer ring 12. The housing 60 is formed to include an air passage 62 that extends radially and axially through the housing 60. The air passage 62 extends along a portion of the outer ring 12. Bypass air flows over a radial outer surface 64 of the housing 60, turns radially inward to flow through the air passage 62, and continues flowing axially aft through the air passage 62 into the flow path 15 of the infrared suppressor 10. The endcap 74 is coupled with the forward end 32 of the inner ring 16 to close an opening formed at the forward end 32 of the inner ring 16.

Figure 5:
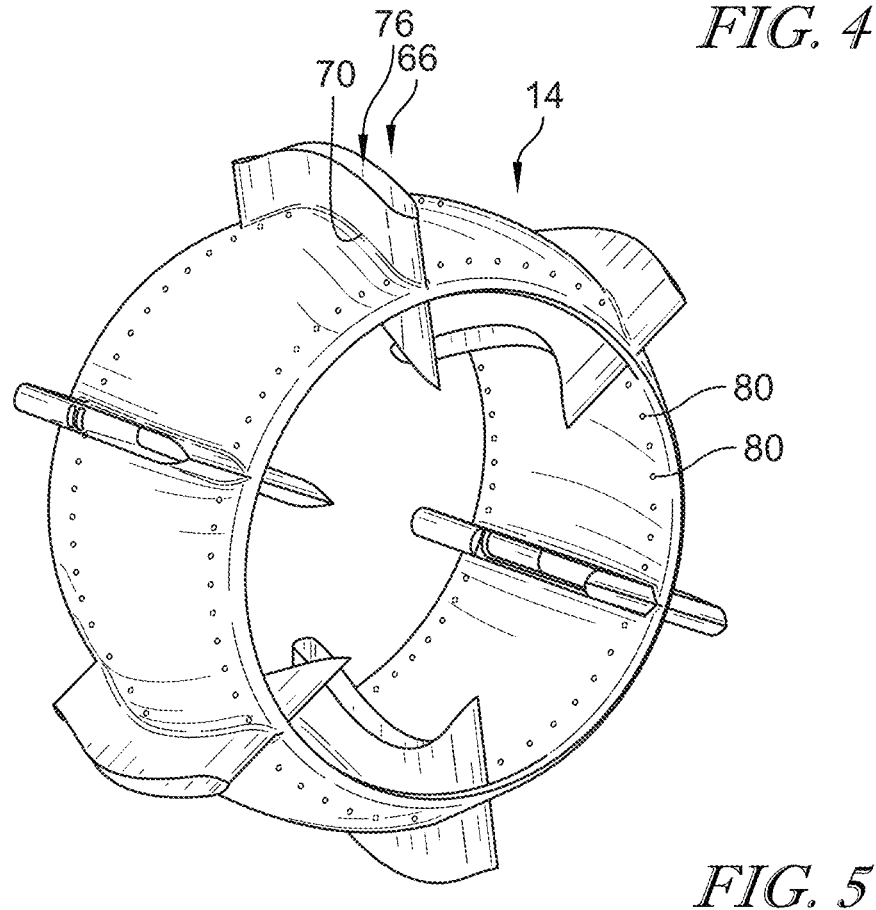
FIG. 5 is a perspective view of a portion of the infrared suppressor of FIG. 1 showing struts extending radially through the intermediate ring that are received by the strut passages formed in the outer ring and the inner ring to couple the rings together and support the rings relative to one another, and further showing that each strut is formed to include a cooling passage extending radially therethrough to direct fluid toward the rings to cool the infrared suppressor.

The infrared suppressor 10 includes a plurality of struts 66 spaced apart circumferentially around the infrared suppressor 10 as shown in FIG. 5. Each of the plurality of struts 66 extends radially between and interconnects the rings 12, 14, 16. The outer ring 12 is formed to include strut passages 68 extending radially therethrough to receive corresponding struts 66 therein. The first intermediate ring 14 is formed to include strut passages 70 extending radially therethrough to receive corresponding struts 66 therein. In other embodiments, the struts 66 are coupled directly to surfaces of the outer ring 12 and the inner ring 16.

The inner ring 16 is formed to include strut passages 72 extending radially therethrough to receive corresponding struts 66 therein. In some embodiments, each of the strut passages 68, 70, 72 formed in the outer ring 12, the first intermediate ring 14, and the inner ring 16, respectively, are circumferentially aligned with one another so that a single strut 66 extends through each strut passage 68, 70, 72 and through the outer ring 12, the first intermediate ring 14, and the inner ring 16 as shown in FIGS. 4 and 5.

Each of the plurality of struts 66 defines a cooling passage 76 that extends radially into each strut 66 as shown in FIG. 6. Fluid 79 passes through the air passage 62 formed in the housing 60 and into the cooling passage 76 to cool the infrared suppressor 10. The fluid 79 may be engine purge air, bypass air, ambient air, or any other fluid capable of cooling the infrared suppressor 10.

Figure 8:
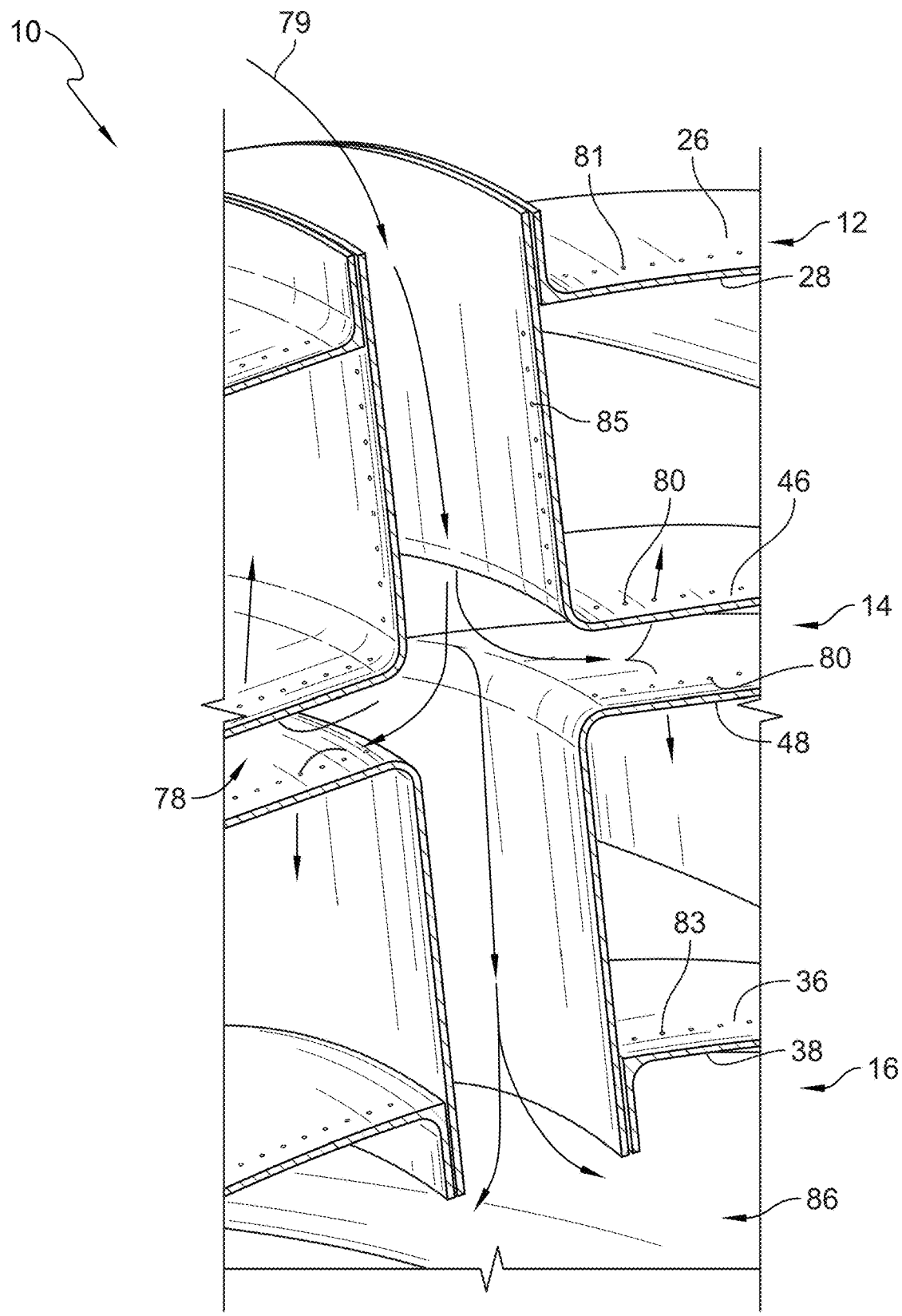
FIG. 8 is an enlarged view of the infrared suppressor of FIG. 7 showing a flow path of the fluid through the infrared suppressor, at least some fluid is directed through the cooling passage formed in each strut, into the cooling cavity of the intermediate ring, and out of the plurality of outlet holes formed in the surfaces of the intermediate ring, and at least some fluid is directed through the cooling passage formed in each strut and into an interior cavity of the inner ring to cool the infrared suppressor and reduce the infrared signature of the gas turbine engine.
Figure 9:
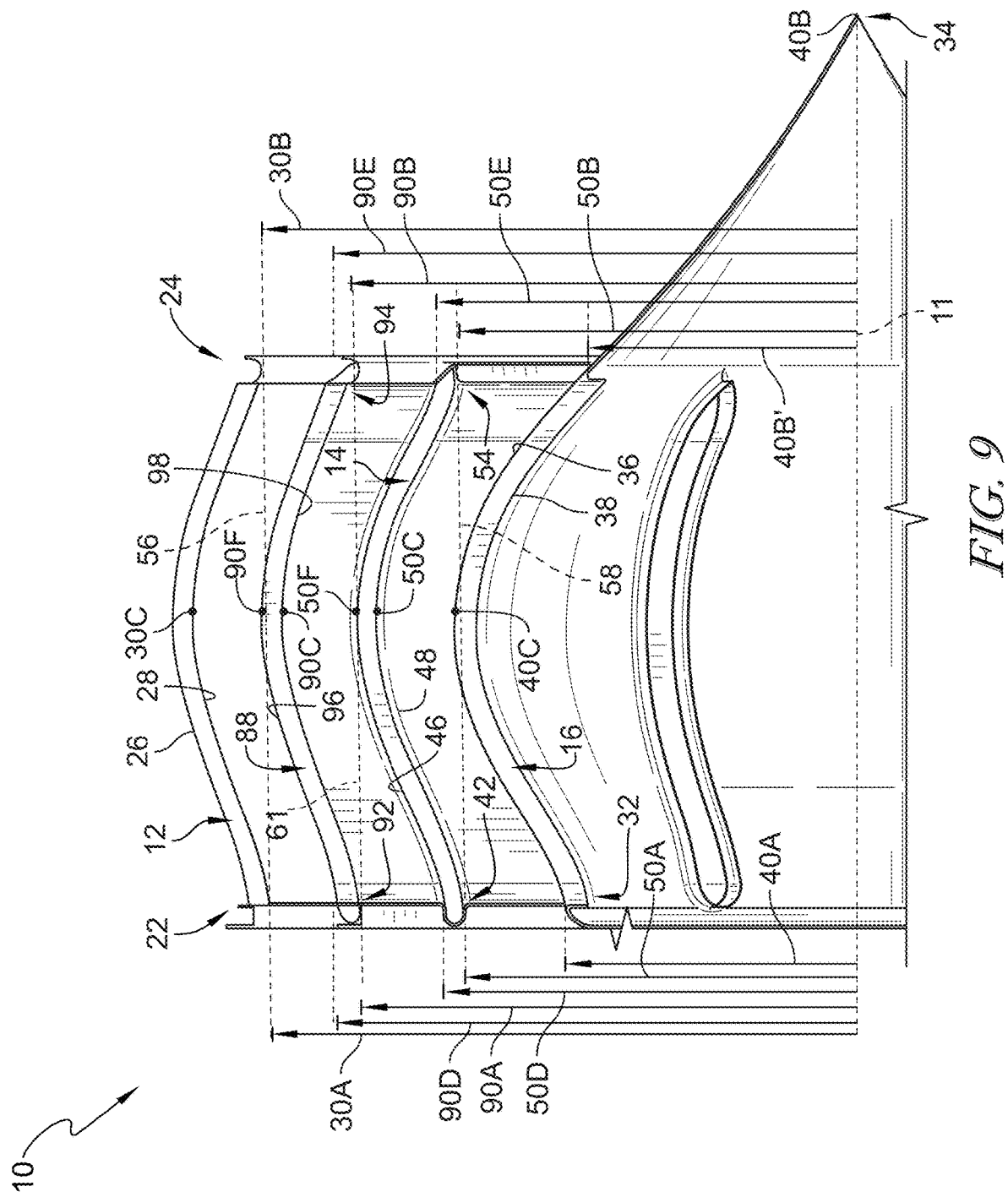
FIG. 9 is a view of the infrared suppressor similar to that of FIG. 3A with an additional intermediate ring included in the infrared suppressor, each additional ring minimizing the radial height of each individual ring to block line-of-sight through the infrared suppressor for a given radial height between the inner ring and the outer ring.

The first intermediate ring 14 is hollow and defines a cooling cavity 78 therein as shown in FIGS. 7 and 8. The cooling cavity 78 is formed between the radial outer surface 46 and the radial inner surface 48 of the first intermediate ring 14. The cooling cavity 78 extends circumferentially around the central axis 11. The cooling cavity 78 formed in the first intermediate ring 14 is fluidly connected with the cooling passage 76 formed in each strut 66 so that at least some of the fluid 79 is directed from the cooling passage 76 into the cooling cavity 78 of the first intermediate ring 14. In some embodiments, at the cooling cavity 78, each of the plurality of struts 66 is formed to include a plurality of holes so that at least some of the fluid 79 can exit the cooling passage 76 through the plurality of holes and enter the cooling cavity 78.

The radial outer surface 46 and the radial inner surface 48 of the first intermediate ring 14 are both formed to include a plurality of outlet holes 80 extending through the surfaces 46, 48 as shown in FIG. 8. The plurality of outlet holes 80 are in fluid communication with the cooling cavity 78 of the first intermediate ring 14. The fluid 79 in the cooling cavity 78 is discharged out of the plurality of outlet holes 80 and into the flow path 15 of the infrared suppressor 10. The fluid 79 cools the first intermediate ring 14 as it flows over the surfaces 46, 48 so that the cooled first intermediate ring 14 emits less infrared radiation.

The outer ring 12 and the inner ring 16 may include a plurality of outlet holes 81, 83 similar to those of the first intermediate ring. The rings 12, 14, 16 may result in a reduced flow area of the flow path 15. The reduced flow area may cause acceleration of the air through the flow path 15, which may create a static pressure difference across the rings 12, 14, 16. The static pressure difference may force the fluid 79 through the plurality of outlet holes 80 formed on the surfaces 46, 48 of the first intermediate ring 14, surface 28 of the outer ring 12, and surface 36 of the inner ring 16 to cool the rings 12, 14, 16.

Illustratively, each strut 66 is formed to include a plurality of outlet holes 85 as shown in FIG. 8. The outlet holes 85 are in fluid communication with the fluid 79 and direct the cooling fluid 79 along an exterior surface of the strut 66 to cool the strut 66 so that the strut 66 emits less radiation.

The cooling passage 76 formed in each strut 66 is fluidly coupled with an interior cavity 86 of the inner ring 16 as shown in FIGS. 7 and 8. At least some of the fluid 79 is directed from the cooling passage 76 formed in each strut 66 into the interior cavity 86 to cool the inner ring 16. The fluid 79 in the interior cavity 86 may flow out of the interior cavity 86 through a plurality of outlet holes formed in the surfaces 36, 38 of the inner ring 16 and into the flow path 15.

In some embodiments, the infrared suppressor 10 includes one or more additional rings 88 (i.e., a second intermediate ring 88) as shown in FIG. 9. In this embodiment, the outer ring 12 and the second intermediate ring 88 are shaped to block line-of-sight between the two rings 12, 88 when viewing the infrared suppressor 10 axially aft looking forward (from a range of or from all vertical positions). Similarly, the first intermediate ring 14 and the second intermediate ring 88 are shaped to block line-of-sight between the two rings 14, 88 when viewing the infrared suppressor 10 axially aft looking forward (from a range of or from all vertical positions). Similarly, the inner ring 16 and the first intermediate ring 14 are shaped to block line-of-sight between the two rings 16, 14 when viewing the infrared suppressor 10 axially aft looking forward (from a range of or from all vertical positions).

The second intermediate ring 88 is arranged circumferentially around the central axis 11 as shown in FIG. 9. The second intermediate ring 88 is spaced apart radially from the outer ring 12, the inner ring 16, and the first intermediate ring 14. The second intermediate ring 88 is located radially between the outer ring 12 and the first intermediate ring 14. The second intermediate ring 88 extends along a fourth curvilinear path from a forward end 92 to an aft end 94 thereof that is spaced apart axially from the forward end 92. In the illustrative embodiment, the aft end 24 of the outer ring 12 and the aft end 94 of the second intermediate ring 88 are generally axially aligned. The second intermediate ring 88 includes a radial outer surface 96 and a radial inner surface 98.

The radial inner surface 98 of the second intermediate ring 88 has a fifth curvilinear contour defined by a first diameter 90A at the forward end 92 of the second intermediate ring 88, a second diameter 90B at the aft end 94, and a fifth radial extreme 90C. The fifth radial extreme 90C is located axially between and radially away from the first diameter 90A and the second diameter 90B of the second intermediate ring 88 relative to the central axis 11.

In the illustrative embodiment, the fifth radial extreme 90C is a radially maximum peak 90C of the radial inner surface 98, the first diameter 90A is a minimum diameter of the radial inner surface 98 of the second intermediate ring 88 forward of the fifth radially maximum peak 90C, and the second diameter 90B is a minimum diameter of the radial inner surface 98 of the second intermediate ring 88 aft of the fifth radially maximum peak 90C.

The radial outer surface 96 of the second intermediate ring 88 has a sixth curvilinear contour defined by a third diameter 90D at the forward end 92 of the second intermediate ring 88, a fourth diameter 90E at the aft end 94, and a sixth radial extreme 90F. The sixth radial extreme 90F is located axially between and radially away from the third diameter 90D and the fourth diameter 90E of the second intermediate ring 88 relative to the central axis 11.

In the illustrative embodiment, the sixth radial extreme 90F is a radially maximum peak 90F of the radial outer surface 96, the third diameter 90D is a minimum diameter of the radial outer surface 96 of the second intermediate ring 88 forward of the sixth radially maximum peak 90F, and the fourth diameter 90E is a minimum diameter of the radial outer surface 96 of the second intermediate ring 88 aft of the sixth radially maximum peak 90F. In the illustrative embodiment, the second intermediate ring 88 is formed to define a cooling cavity therein.

In the embodiment of the infrared suppressor 10 shown in FIG. 9, the sixth radially maximum peak 90F of the radial outer surface 96 of the second intermediate ring 88 is located radially tangent with or radially outward of the annular first imaginary surface 56 to block line-of-sight 17 between the outer ring 12 and the second intermediate ring 88 and reduce infrared signature during the use of the infrared suppressor 10.

Locating the sixth radially maximum peak 90F of the radial outer surface 96 of the second intermediate ring 88 radially tangent with or radially outward of the annular first imaginary surface 56 blocks line-of-sight 17 between the outer ring 12 and the second intermediate ring 88 for a range of or all vertical locations. In the illustrative embodiment, the sixth radially maximum peak 90F of the radial outer surface 96 of the second intermediate ring 88 is tangent with the annular first imaginary surface 56. In other embodiments, the sixth radially maximum peak 90F of the radial outer surface 96 of the second intermediate ring 88 extends radially outward and beyond the annular first imaginary surface 56.

Referring to FIG. 9, an annular third imaginary surface 61 is defined between and interconnects the first diameter 90A and the second diameter 90B of the second intermediate ring 88. The annular third imaginary surface 61 has a constant slope relative to the central axis 11 as it extends axially between the first diameter 90A and the second diameter 90B of the second intermediate ring 88. The fourth radially maximum peak 50F of the radial outer surface 46 of the first intermediate ring 14 is located radially tangent with or radially outward of the annular third imaginary surface 61 to block line-of-sight between the first intermediate ring 14 and the second intermediate ring 88 and reduce infrared signature during the use of the infrared suppressor 10.

Locating the fourth radially maximum peak 50F of the radial outer surface 46 of the first intermediate ring 14 radially tangent with or radially outward of the annular third imaginary surface 61 may block line-of-sight between the first intermediate ring 14 and the second intermediate ring 88 for a range of or all vertical locations. In the illustrative embodiment, the fourth radially maximum peak 50F of the radial outer surface 46 of the first intermediate ring 14 is tangent with the annular third imaginary surface 61. In other embodiments, the fourth radially maximum peak 50F of the radial outer surface 46 of the first intermediate ring 14 extends radially outward and beyond the annular third imaginary surface 61.

In some embodiments, the radial outer surface 96 and the radial inner surface 98 of the second intermediate ring 88 are both formed to include a plurality of outlet holes extending through the surfaces 96, 98. The plurality of outlet holes are in fluid communication with the cooling cavity of the second intermediate ring 88.

Another embodiment of an infrared suppressor 210 in accordance with the present disclosure is shown in FIGS. 10-13. The infrared suppressor 210 is substantially similar to the infrared suppressor 10 shown in FIGS. 1-9 and described herein. Accordingly, similar reference numbers in the 200 series indicate features that are common between the infrared suppressor 10 and the infrared suppressor 210. The description of the infrared suppressor 10 is incorporated by reference to apply to the infrared suppressor 210, except in instances when it conflicts with the specific description and the drawings of the infrared suppressor 210.

The infrared suppressor 210 includes an outer ring 212, a first intermediate ring 214, and an inner ring 216 as shown in FIGS. 10-13. The outer ring 212 and the first intermediate ring 214 are shaped to block line-of-sight between the two rings 212, 214 when viewing the infrared suppressor 210 axially aft looking forward (from a range of or from all vertical positions). Similarly, the inner ring 216 and the first intermediate ring 214 are shaped to block line-of-sight between the two rings 216, 214 when viewing the infrared suppressor 210 axially aft looking forward (from a range of or from all vertical positions).

Figure 10:
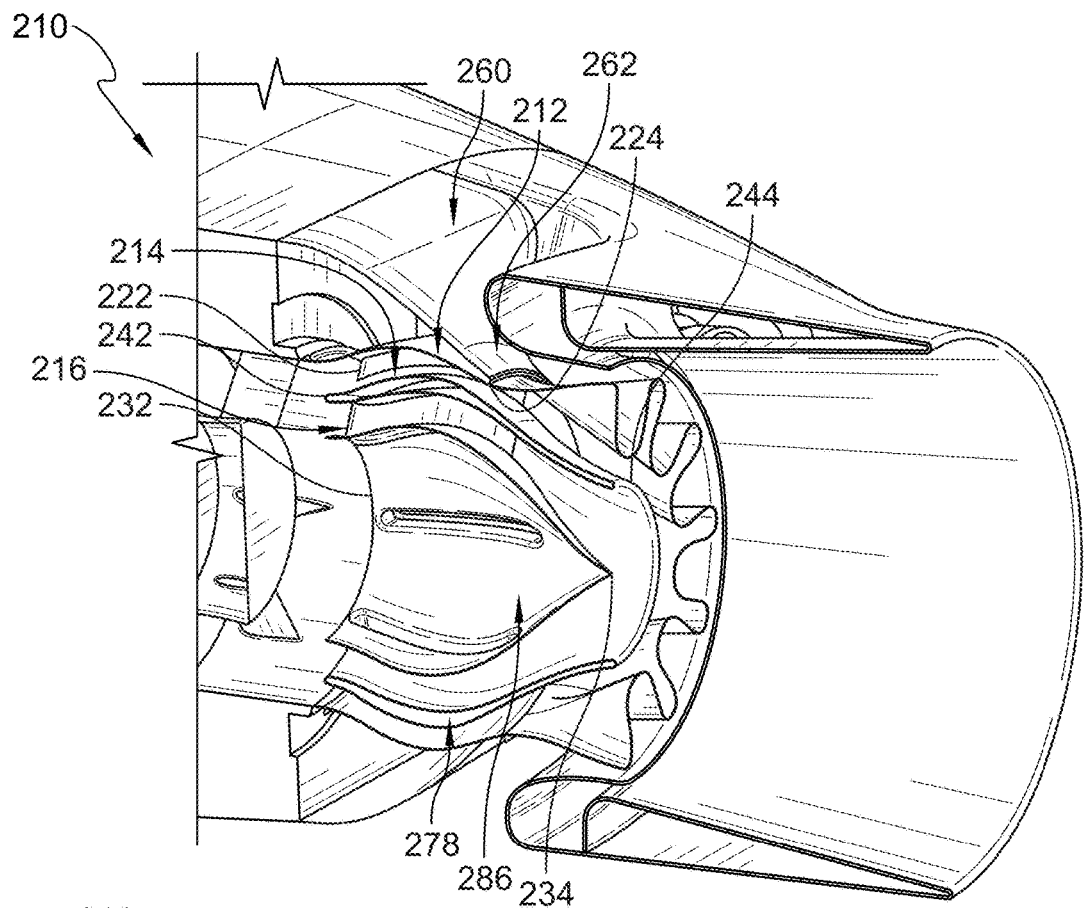
FIG. 10 is a cutaway perspective view of a gas turbine engine having another embodiment of an infrared suppressor including an outer ring, an elongated intermediate ring, and an inner ring that cooperate to block line-of-sight through the infrared suppressor to reduce an infrared signature of the gas turbine engine, and further showing that the elongated intermediate ring extends beyond an aft end of the outer ring.
Figure 11:
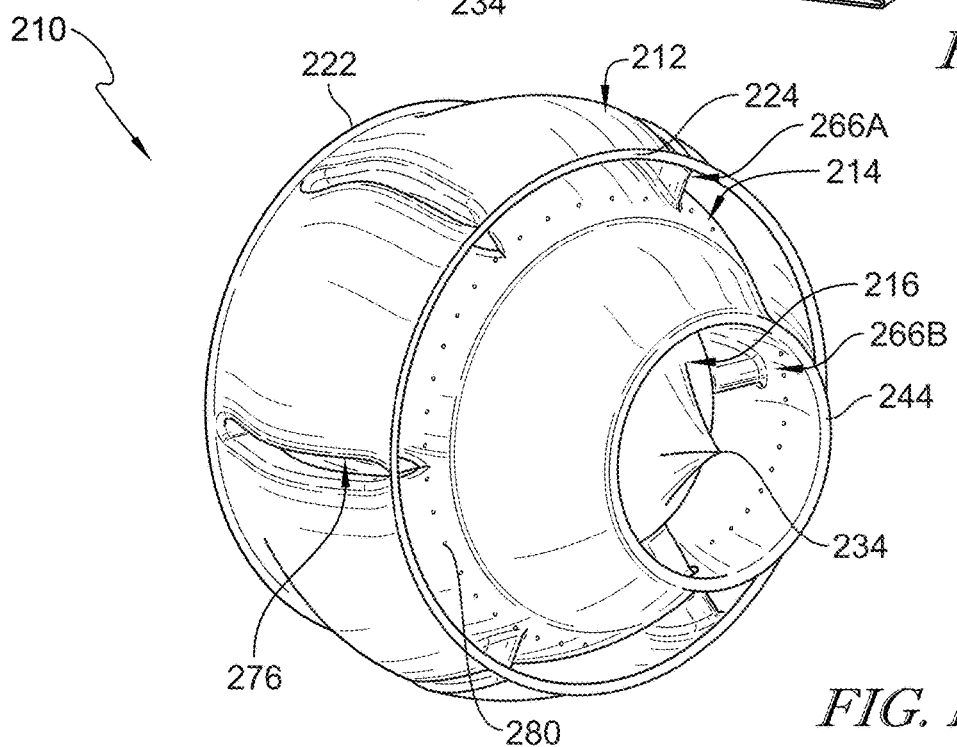
FIG. 11 is a perspective view of the infrared suppressor of FIG. 10, showing the elongated intermediate ring extends axially aft beyond the aft end of the outer ring and toward the aft end of the inner ring, and further showing struts formed to include cooling passages therein extend radially through the rings.
Figure 12:
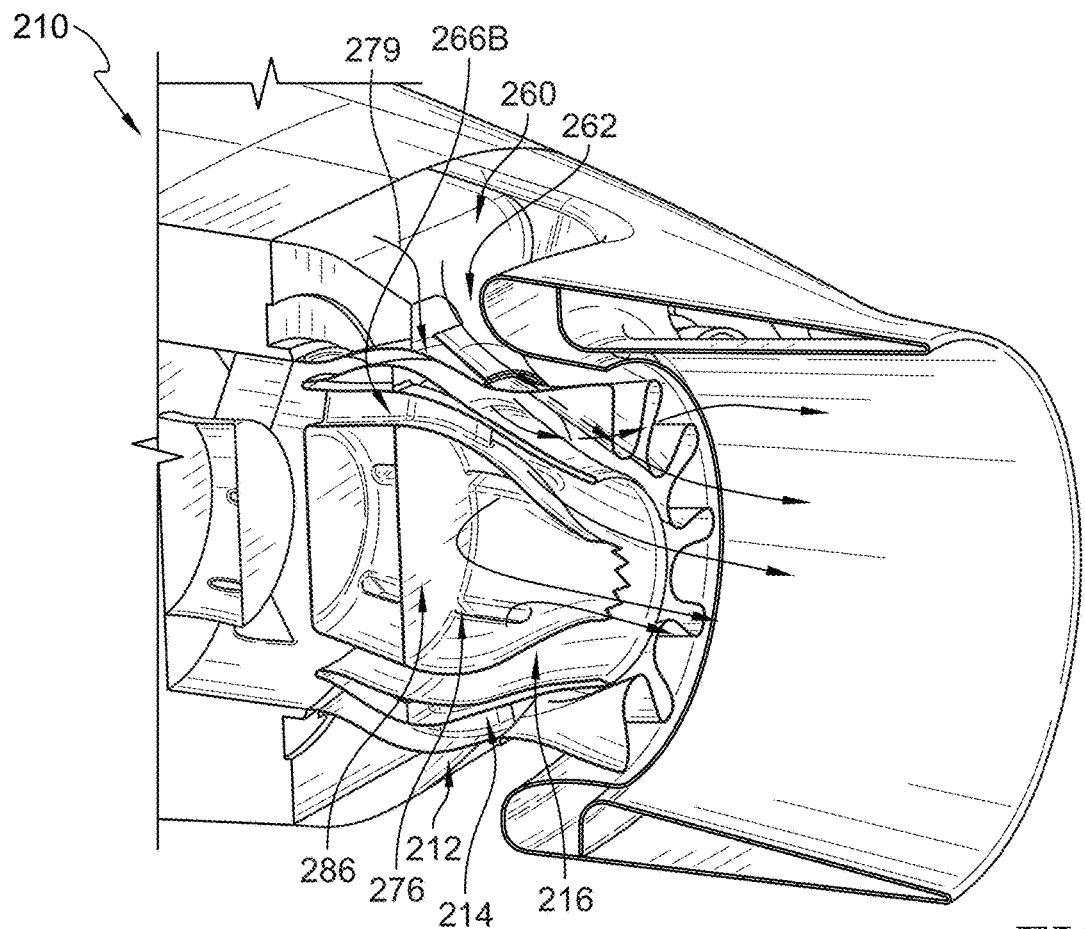
FIG. 12 is a cutaway perspective view of a gas turbine engine similar to FIG. 10 showing a flow path of fluid through the infrared suppressor to cool the infrared suppressor, and further showing that at least some fluid flows through the cooling passages formed in the struts to reach an interior cavity of the inner ring.

The outer ring 212 is arranged circumferentially around a central axis as shown in FIGS. 10-12. The outer ring 212 extends along a first curvilinear path from a forward end 222 to an aft end 224 thereof that is spaced apart axially from the forward end 222 as shown in FIG. 11. The outer ring 12 includes a radial outer surface and a radial inner surface that defines the outer boundary of a flow path.

The inner ring 216 is arranged circumferentially around the central axis as shown in FIGS. 10-12. The inner ring 216 is spaced apart radially from the outer ring 212. The inner ring 216 extends along a second curvilinear path from a forward end 232 to an aft end 234 thereof that is spaced apart axially from the forward end 232 as shown in FIG. 10. The inner ring 216 is formed as a tail cone in the illustrative embodiment as shown in FIG. 10.

The first intermediate ring 214 is arranged circumferentially around the central axis as shown in FIGS. 10-12. The first intermediate ring 214 is spaced apart radially from the outer ring 212 and the inner ring 216. The first intermediate ring 214 extends along a third curvilinear path from a forward end 242 to an aft end 244 thereof that is spaced apart axially from the forward end 242 as shown in FIG. 10.

The first intermediate ring 214 is located radially between the outer ring 212 and the inner ring 216 to block line-of-sight through the infrared suppressor 210 as suggested in FIGS. 10-12. The first intermediate ring 214 is elongated such that the aft end 244 extends beyond the aft end 224 of the outer ring 212 as shown in FIGS. 10 and 11. The aft end 244 of the first intermediate ring 214 is spaced apart axially aft of the aft end 224 of the outer ring 212. The aft end 244 of the first intermediate ring 214 is generally aligned with the aft end 234 of the inner ring 216, and the aft end 224 of the outer ring 212 is located axially forward of both the aft end 244 of the first intermediate ring 214 and the aft end 234 of the inner ring 216.

The infrared suppressor 210 includes a housing 260 arranged circumferentially around the outer ring 212 as shown in FIGS. 10 and 12. The housing 260 extends axially aft beyond the aft end 224 of the outer ring 212. The housing 260 is formed to include an air passage 262 that extends radially and axially through the housing 260. The air passage 262 extends along a portion of the outer ring 212.

Figure 13:
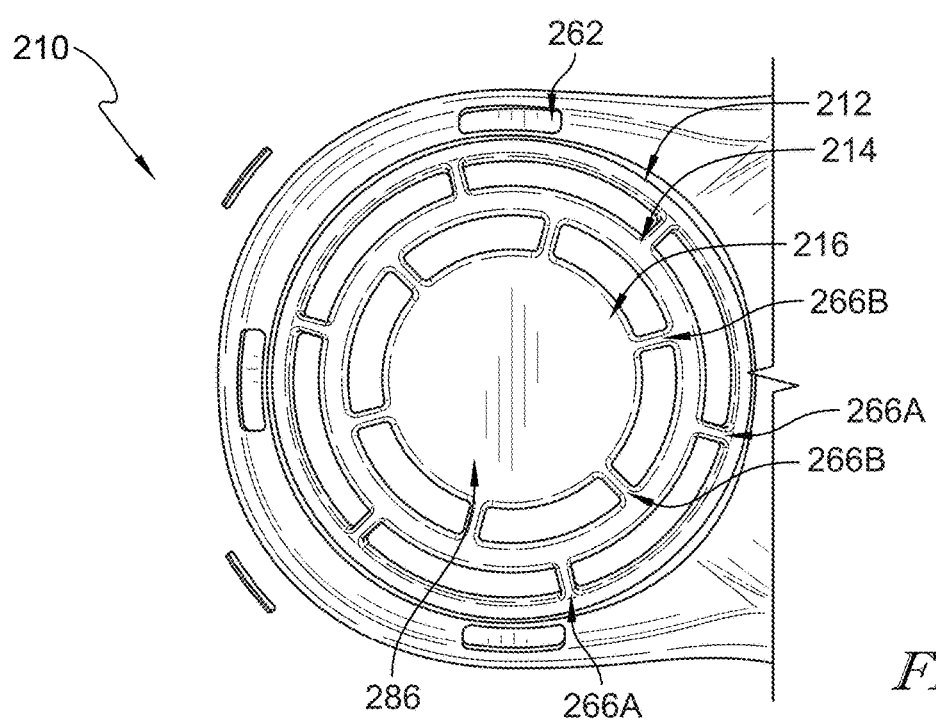
FIG. 13 is a cutaway perspective view of the infrared suppressor looking axially forward at the infrared suppressor showing the struts include first struts that extend between and couple the outer ring and the intermediate ring together and second struts that extend between and couple the intermediate ring and the inner ring together, and the first struts and the second struts are circumferentially offset from one another.

The infrared suppressor 210 includes a plurality of first struts 266A and a plurality of second struts 266B as shown in FIGS. 11 and 13. Each of the plurality of first struts 266A extends radially between and interconnects the outer ring 212 and the first intermediate ring 214. Each of the plurality of second struts 266B extends radially between and interconnects the first intermediate ring 214 and the inner ring 216. The plurality of first struts 266A are spaced apart about circumferentially about the infrared suppressor 210. The plurality of second struts 266B are spaced apart about circumferentially about the infrared suppressor 210. The plurality of first struts 266A and the plurality of second struts 266B are staggered relative to one another such that each of the plurality of first struts 266A is circumferentially located between two adjacent second struts 266B as shown in FIG. 13. Each of the plurality of first struts 266A is offset circumferentially from each of the plurality of second struts 266B.

As shown in FIG. 13, none of the plurality of second struts 266B extending between the inner ring 216 and the first intermediate ring 214 are aligned circumferentially with one of the plurality of first struts 266A, and none of the plurality of first struts 266A extending between the outer ring 212 and the first intermediate ring 214 are aligned circumferentially with one of the plurality of second struts 266B. The offset placement of the struts 266A, 266B allows for thermal expansion of the rings 212, 214, 216 with a reduction in mechanical stress. Any embodiment of the infrared suppressor 10, 210, 310, 410, 510 may include circumferentially staggered struts.

Each of the plurality of struts 266A, 266B defines a cooling passage 276 that extends radially into each strut 266A, 266B as shown in FIG. 11. Fluid 279 flows from the air passage 262 formed in the housing 260 through the cooling passage 276 to cool the infrared suppressor 210.

The first intermediate ring 214 is hollow and defines a cooling cavity 278 therein as shown in FIG. 10. The cooling cavity 278 is formed between a radial outer surface and a radial inner surface of the first intermediate ring 214. The cooling cavity 278 formed in the first intermediate ring 214 is fluidly connected with the cooling passages 276 formed in each strut 266A, 266B. At least some of the fluid 279 is directed from the air passage 262, into the cooling passages 276 formed in the plurality of first struts 266A, into the cooling cavity 278 of the first intermediate ring 214, and through the cooling passages 276 formed in the plurality of second struts 266B.

In some embodiments, the radial outer surface and the radial inner surface of the first intermediate ring 214 are both formed to include a plurality of outlet holes 280 extending through the surfaces as shown in FIG. 11. The plurality of outlet holes 280 are in fluid communication with the cooling cavity 278 of the first intermediate ring 214. At least some of the fluid 279 in the cooling cavity 278 is discharged out of the plurality of outlet holes 280 to cool the first intermediate ring 214 as the fluid 279 flows over the surfaces. In some embodiments, the outer ring 212 and the inner ring 216 each include a plurality of outlet holes formed in the surfaces of the rings 212, 216. Thus, the rings 212, 214, 216 are cooled by the fluid 279 so that the rings 212, 214, 216 emit less infrared radiation. In some embodiments, the struts 266 are formed to include outlet holes for directing cooling fluid along the outside of the struts 266.

The cooling passage 276 formed in each of the plurality of second struts 266B is fluidly coupled with an interior cavity 286 of the inner ring 216 as shown in FIG. 10. At least some of the fluid 279 is directed from the cooling passages 276 into the interior cavity 286 to cool the radial inner surface of the inner ring 216 as shown in FIG. 12.

In the illustrative embodiment, the aft end 224 of the outer ring 212 is located axially forward of both the aft end 244 of the first intermediate ring 214 and the aft end 234 of the inner ring 216. The aft end 244 of the first intermediate ring 214 is generally axially aligned with the aft end 234 of the inner ring 216. In other embodiments, the aft end 244 of the first intermediate ring 214 is located axially forward of the aft end 234 of the inner ring 216 and/or generally aligned axially with the aft end 224 of the outer ring 212. Illustratively, the inner ring 216 is an open tail cone having minimum diameter that is greater than zero as compared to the zero diameter second diameter 40B at the aft end of the inner ring 16 in FIG. 3A. In other embodiments, the inner ring 216 has a generally zero diameter at its aftmost end. In other embodiments, the radial extremes are radially minimum troughs as shown in FIGS. 14-16.

Another embodiment of an infrared suppressor 310 in accordance with the present disclosure is shown in FIGS. 14-16. The infrared suppressor 310 is substantially similar to the infrared suppressor 10 shown in FIGS. 1-9 and described herein and the infrared suppressor 210 shown in FIGS. 10-13 and described herein. Accordingly, similar reference numbers in the 300 series indicate features that are common between the infrared suppressor 10, the infrared suppressor 210, and the infrared suppressor 310. The description of the infrared suppressor 10 and the infrared suppressor 210 is incorporated by reference to apply to the infrared suppressor 310, except in instances when it conflicts with the specific description and the drawings of the infrared suppressor 310.

The infrared suppressor 310 includes an outer ring 312, a first intermediate ring 314, and an inner ring 316 as shown in FIGS. 14-16. The outer ring 312 and the first intermediate ring 314 are shaped to block line-of-sight between the two rings 312, 314 when viewing the infrared suppressor 310 axially aft looking forward (from a range of or from all vertical positions). Similarly, the inner ring 316 and the first intermediate ring 314 are shaped to block line-of-sight between the two rings 316, 314 when viewing the infrared suppressor 310 axially aft looking forward (from a range of or from all vertical positions).

The outer ring 312 is arranged circumferentially around the central axis 311 as shown in FIGS. 14-16. The outer ring 312 extends along a first curvilinear path from a forward end 322 to an aft end 324 thereof that is spaced apart axially from the forward end 322 as shown in FIG. 14. The outer ring 312 includes a radial outer surface 326 and a radial inner surface 328 that defines an outer boundary of a flow path of the infrared suppressor 310. The radial outer surface 326 is exposed to bypass air from a fan.

The radial inner surface 328 of the outer ring 312 has a first curvilinear contour defined by a first diameter 330A at the forward end 322 of the outer ring 312, a second diameter 330B at the aft end 324 of the outer ring 312, and a first radial extreme 330C as shown in FIG. 14. The first radial extreme 330C is located axially between and radially away from the first diameter 330A and the second diameter 330B relative to the central axis 311.

In the illustrative embodiment, the first radial extreme 330C is a radially minimum trough 330C, the first diameter 330A is maximum diameter of the outer ring 312 forward of the first radially minimum trough 330C, and the second diameter 330B is a maximum diameter of the outer ring 312 aft of the first radially minimum trough 330C as shown in FIG. 14.

The inner ring 316 is arranged circumferentially around the central axis 311 as shown in FIGS. 14-16. The inner ring 316 is spaced apart radially from the outer ring 312 and defines an inner boundary of the flow path of the infrared suppressor 310. The inner ring 316 extends along a second curvilinear path from a forward end 332 to an aft end 334 thereof that is spaced apart axially from the forward end 332 as shown in FIG. 14. The inner ring 316 includes a radial inner surface 338 and a radial outer surface 336 that defines the inner boundary of the flow path. In some embodiments, the inner ring 316 is formed as a tail cone for the gas turbine engine as shown in FIGS. 14 and 15.

The radial outer surface 336 of the inner ring 316 has a second curvilinear contour defined by a first diameter 340A at the forward end 332 of the inner ring 316, a second diameter 340B at the aft end 334, and a second radial extreme 340C. The second radial extreme 340C is located axially between and radially away from the first diameter 340A and the second diameter 340B relative to the central axis 311.

The second radial extreme 340C is a radially minimum trough 340C of the radial outer surface 336, the first diameter 340A is a maximum diameter of the inner ring 316 forward of the second radially minimum trough 340C, and the second diameter 340B is a maximum diameter of the inner ring 316 aft of the second radially minimum trough 340C as shown in FIG. 14. In the illustrative embodiment, the inner ring 316 is the tail cone and, thus, the second diameter 340B is equal to about zero and the aft end 334 is the tip of the tail cone. In other embodiments, the aft end 334 and the second diameter 340B may be located generally axially aligned with the aft end 324 of the outer ring 312 and the second diameter 340B may be greater than zero as suggested by aft end 334' and second diameter 340B' in FIG. 14

The first intermediate ring 314 is arranged circumferentially around the central axis 311 as shown in FIGS. 14-16. The first intermediate ring 314 is spaced apart radially from the outer ring 312 and the inner ring 316 as shown in FIGS. 14-16. The first intermediate ring 314 extends along a third curvilinear path from a forward end 342 to an aft end 344 thereof that is spaced apart axially from the forward end 342 as shown in FIG. 14. The aft end 324 of the outer ring 312 and the aft end 344 of the first intermediate ring 314 are generally axially aligned as shown in FIG. 14. The first intermediate ring 314 includes a radial outer surface 346 and a radial inner surface 348.

The radial inner surface 348 of the first intermediate ring 314 has a third curvilinear contour defined by a first diameter 350A at the forward end 342 of the first intermediate ring 314, a second diameter 350B at the aft end 344, and a third radial extreme 350C. The third radial extreme 350C is located axially between and radially away from the first diameter 350A and the second diameter 350B of the first intermediate ring 314 relative to the central axis 311.

The third radial extreme 350C is a radially minimum trough 350C of the radial inner surface 348, the first diameter 350A is a maximum diameter of the radial inner surface 348 of the first intermediate ring 314 forward of the third radially minimum trough 350C, and the second diameter 350B is a maximum diameter of the radial inner surface 348 of the first intermediate ring 314 aft of the third radially minimum trough 350C as shown in FIG. 14.

The radial outer surface 346 of the first intermediate ring 314 has a fourth curvilinear contour defined by a third diameter 350D at the forward end 342 of the first intermediate ring 314, a fourth diameter 350E at the aft end 344, and a fourth radial extreme 350F. The fourth radial extreme 350F is located axially between and radially away from the third diameter 350D and the fourth diameter 350E of the first intermediate ring 314 relative to the central axis 311.

The fourth radial extreme 350F is a radially minimum trough 350F of the radial outer surface 346, the third diameter 350D is a maximum diameter of the radial outer surface 346 of the first intermediate ring 314 forward of the fourth radially minimum trough 350F, and the fourth diameter 350E is a maximum diameter of the radial outer surface 346 of the first intermediate ring 314 aft of the fourth radially minimum trough 350F as shown in FIG. 14.

The first intermediate ring 314 is located radially between the outer ring 312 and the inner ring 316 to block line-of-sight through the infrared suppressor 310 as suggested in FIGS. 14 and 15. In particular, a portion of the first intermediate ring 314 is tangent with or overlaps (when viewed axially) portions of the outer ring 312, and a portion of the inner ring 316 is tangent with or overlaps (when viewed axially) portions of the first intermediate ring 314.

Referring to FIG. 14, an annular first imaginary surface 356 is defined between and interconnects the third diameter 350D and the fourth diameter 350E of the first intermediate ring 314. The annular first imaginary surface 356 has a constant slope relative to the central axis 311 as it extends axially between the third diameter 350D and the fourth diameter 350E of the first intermediate ring 314. The first radially minimum trough 330C of the outer ring 212 is located radially tangent with or radially inward of the annular first imaginary surface 356 to block line-of-sight between the outer ring 312 and the first intermediate ring 314 and reduce infrared signature during the use of the infrared suppressor 310.

Locating the first radially minimum trough 330C of the outer ring 312 radially tangent with or radially inward of the annular first imaginary surface 356 may block line-of-sight between the outer ring 312 and the first intermediate ring 314 for a range of or all vertical locations. In the illustrative embodiment, the first radially minimum trough 330C of the outer ring 312 extends radially inward and beyond the annular first imaginary surface 356.

Referring to FIG. 14, an annular second imaginary surface 358 is defined between and interconnects the first diameter 340A and the second diameter 340B' of the inner ring 316. The annular second imaginary surface 358 has a constant slope relative to the central axis 311 as it extends axially between the first diameter 340A and the second diameter 340B' of the inner ring 316. The third radially minimum trough 350C of the radial inner surface 348 of the first intermediate ring 314 is located radially tangent with or radially inward of the annular second imaginary surface 358 to block line-of-sight between the first intermediate ring 314 and the inner ring 316 and reduce infrared signature during the use of the infrared suppressor 310.

Locating the third radially minimum trough 350C of the radial inner surface 348 of the first intermediate ring 314 radially tangent with or radially inward of the annular second imaginary surface 358 may block line-of-sight between the first intermediate ring 314 and the inner ring 316 for a range of or all vertical locations. In the illustrative embodiment, the third radially minimum trough 350C of the radial inner surface 348 of the first intermediate ring 314 extends radially inward and beyond the annular second imaginary surface 358.

In some embodiments, the infrared suppressor 310 includes a housing formed to include an air passage that extends radially and axially through the housing, similar to the housing 60, 260 and the air passage 62, 262 previously described. The infrared suppressor 310 includes a plurality of struts 366 spaced apart circumferentially around the infrared suppressor 310 as shown in FIGS. 15 and 16. Each of the plurality of struts 366 extends radially between and interconnects the rings 312, 314, 316. In some embodiments, one strut 366 extends radially between and interconnects the outer ring 312 and the first intermediate ring 314, and another strut 366 circumferentially aligned with the one strut 366 extends radially between and interconnects the first intermediate ring 314 and the inner ring 316. In some embodiments, a single strut extends radially between and interconnects all three rings 312, 314, 316.

Each of the plurality of struts 366 extends radially between the rings 312, 314, 316 at a canted angle relative to the central axis 311 as shown in FIG. 16. The canted angle of each of the plurality of struts 366 does not pass through or intersect the central axis 311. The geometry and arrangement of each of the plurality of struts 366 reduces mechanical stress on the rings 312, 314, 316 due to thermal expansion. Any embodiment of the infrared suppressor 10, 210, 310, 410, 510 may include struts having a canted angle.

Each of the plurality of struts 366 defines a cooling passage 376 that extends radially into each strut 366 as shown in FIG. 15. Fluid passes through the air passage formed in the housing and into the cooling passages 376 to cool the infrared suppressor 310.

The first intermediate ring 314 is hollow and defines a cooling cavity 378 therein as shown in FIG. 14. The cooling cavity 378 is formed between the radial outer surface 346 and the radial inner surface 348 of the first intermediate ring 314. The cooling cavity 378 formed in the first intermediate ring 314 is fluidly connected with the cooling passage 376 formed in each strut 366 so that at least some fluid is directed from the cooling passage 376 into the cooling cavity 378 of the first intermediate ring 314. In some embodiments, at the cooling cavity 378, each of the plurality of struts 366 is formed to include a plurality of holes so that the fluid can exit the cooling passage 376 and enter the cooling cavity 378.

The radial outer surface 346 and the radial inner surface 348 of the first intermediate ring 314 are both formed to include a plurality of outlet holes 380 extending through the surfaces 346, 348. The plurality of outlet holes 380 are in fluid communication with the cooling cavity 378 of the first intermediate ring 314. The fluid in the cooling cavity 378 is discharged out of the plurality of outlet holes 380 and into the flow path. The fluid 379 cools the first intermediate ring 314 as it flows over the surfaces 346, 348 so that the cooled first intermediate ring 314 emits less infrared radiation. In some embodiments, the outer ring 313, the inner ring 316, and the struts 366, are formed to include a plurality of outlet holes. Thus, the rings 312, 314, 316 and the struts 366 are cooled by the fluid so that the rings 312, 314, 316 and the struts 366 emit less infrared radiation.

Another embodiment of an infrared suppressor 410 in accordance with the present disclosure is shown in FIG. 17. The infrared suppressor 410 is substantially similar to the infrared suppressor 10 shown in FIGS. 1-9 and described herein, the infrared suppressor 210 shown in FIGS. 10-13 and described herein, and the infrared suppressor 310 shown in FIGS. 14-16 and described herein. Accordingly, similar reference numbers in the 400 series indicate features that are common between the infrared suppressor 10, the infrared suppressor 210, the infrared suppressor 310, and the infrared suppressor 410. The description of the infrared suppressor 10, the infrared suppressor 210, and the infrared suppressor 310 is incorporated by reference to apply to the infrared suppressor 410, except in instances when it conflicts with the specific description and the drawings of the infrared suppressor 410.

The infrared suppressor 410 includes an outer ring 412, a first intermediate ring 414, and an inner ring 416 as shown in FIG. 17. The outer ring 412 and the first intermediate ring 414 are shaped to block line-of-sight between the two rings 412, 414 when viewing the infrared suppressor 410 axially aft looking forward (from a range of or from all vertical positions). Similarly, the inner ring 416 and the first intermediate ring 414 are shaped to block line-of-sight between the two rings 416, 414 when viewing the infrared suppressor 410 axially aft looking forward (from a range of or from all vertical positions).

The outer ring 412 is arranged circumferentially around the central axis as shown in FIG. 17. The outer ring 412 extends between a forward end 422 and an aft end 424 thereof that is spaced apart axially from the forward end 222 as shown in FIG. 17. The outer ring 412 includes a radial outer surface 426 and a radial inner surface 428 that defines an outer boundary of a flow path.

The radial inner surface 428 of the outer ring 412 has a first contour defined by a first diameter at the forward end 422 of the outer ring 412, a second diameter at the aft end 424 of the outer ring 412, and a first radial extreme 430C as shown in FIG. 17. The first radial extreme 430C is located axially between and radially away from the first diameter and the second diameter relative to the central axis. In the illustrative embodiment, the first radial extreme 430C is a radially minimum trough 430C of the radial inner surface 428.

The inner ring 416 is arranged circumferentially around the central axis as shown in FIG. 17. The inner ring 416 is spaced apart radially from the outer ring 412 and defines an inner boundary of the flow path of the infrared suppressor 410 as shown in FIG. 17. The inner ring 416 extends between a forward end 432 and an aft end 434 thereof that is spaced apart axially from the forward end 432 as shown in FIG. 17. The inner ring 416 includes a radial outer surface 436 that defines the inner boundary of the flow path. The inner ring 416 is formed as a tail cone for the gas turbine engine.

The radial outer surface 436 of the inner ring 416 has a second contour defined by a first diameter at the forward end 432 of the inner ring 416, a second diameter at the aft end 434, and a second radial extreme 440C. The second radial extreme 440C is located axially between and radially away from the first diameter and the second diameter relative to the central axis.

The first intermediate ring 414 is arranged circumferentially around the central axis as shown in FIG. 17. The first intermediate ring 414 is spaced apart radially from the outer ring 412 and the inner ring 416. The first intermediate ring 414 extends between a forward end 442 and an aft end 444 thereof that is spaced apart axially from the forward end 442. The aft end 424 of the outer ring 412 and the aft end 444 of the first intermediate ring 414 are generally axially aligned. The first intermediate ring 414 includes a radial outer surface 446 and a radial inner surface 448.

The radial inner surface 448 of the first intermediate ring 414 has a third contour defined by a first diameter at the forward end 442 of the first intermediate ring 414, a second diameter at the aft end 444, and a third radial extreme 450C. The third radial extreme 450C is located axially between and radially away from the first diameter and the second diameter of the first intermediate ring 414 relative to the central axis. In the illustrative embodiment, the third radial extreme 450C is a radially minimum trough 450C of the radial inner surface 448.

The radial outer surface 446 of the first intermediate ring 414 has a fourth contour defined by a third diameter at the forward end 442 of the first intermediate ring 414, a fourth diameter at the aft end 444, and a fourth radial extreme 450F. The fourth radial extreme 450F is located axially between and radially away from the third diameter and the fourth diameter of the first intermediate ring 414 relative to the central axis.

In some embodiments, the first intermediate ring 414 is formed to define a cooling cavity therein. In some embodiments, the outer ring 412 and the inner ring 416 are formed with cooling cavities therein.

The first intermediate ring 414 is located radially between the outer ring 412 and the inner ring 416 to block line-of-sight through the infrared suppressor 410 as suggested in FIG. 17. In particular, a portion of the first intermediate ring 414 is tangent with or overlaps (when viewed axially) portions of the outer ring 412, and a portion of the inner ring 416 is tangent with or overlaps (when viewed axially) portions of the first intermediate ring 414.

The infrared suppressor 410 includes a housing 460 as shown in FIG. 17 and may include a mixer coupled with an aft end of the housing 460 and a diffuser arranged axially aft of the mixer. The mixer mixes cool air with hot exhaust to suppress infrared radiation. The diffuser helps the exhaust merge with an ambient air stream and aids in line-of-sight blockage. Any embodiment of the infrared suppressor 10, 210, 310, 410, 510 may include the mixer and/or the diffuser.

The infrared suppressor 410 includes a plurality of struts 466 spaced apart circumferentially around the infrared suppressor 410 as shown in FIG. 17. Each of the plurality of struts 466 extends radially between and interconnects the rings 412, 414, 416. In some embodiments, each of the plurality of struts 466 defines a cooling passage that extends radially into each strut 466.

In some embodiments, the first intermediate ring 414 is hollow and defines a cooling cavity therein that is fluidly connected with the cooling passage formed in each strut so that fluid is directed from the cooling passage into the cooling cavity. In some embodiments, the surfaces 446, 448 of the first intermediate ring 414 are both formed to include a plurality of outlet holes extending through the surfaces 446, 448. The plurality of outlet holes are in fluid communication with the cooling cavity of the first intermediate ring 414. In some embodiments, the outer ring 412 and the inner ring 416 are both formed to include a plurality of outlet holes.

A method of providing the infrared suppressor 10, 210, 310, 410 is disclosed. The method includes providing the first ring 12, 212, 312, 412 arranged circumferentially around the central axis 11, 311. The first ring 12, 212, 312, 412 has the forward end 22, 222, 322, 422 of the first ring 12, 212, 312, 412 the aft end 24, 224, 324, 424 of the first ring 12, 212, 312, 412 that is spaced apart axially from the forward end 22, 222, 322, 422 of the first ring 12, 212, 312, 412 relative to the central axis 11, 311, and the first radial extreme 30C, 330C, 430C, located axially between and radially spaced apart from the forward end 22, 222, 322, 422 of the first ring 12, 212, 312, 412 and the aft end 24, 224, 324, 424 of the first ring 12, 212, 312, 412 relative to the central axis 11, 311.

The method includes providing the second ring 14, 214, 314, 414 axially aligned with the first ring 12, 212, 312, 412. The second ring 14, 214, 314, 414 is arranged circumferentially around the central axis 11, 311. The second ring 14, 214, 314, 414 has the forward end 42, 242, 342, 442 of the second ring 14, 214, 314, 414, the aft end 44, 244, 344, 444 of the second ring 14, 214, 314, 414 that is spaced apart axially from the forward end 42, 242, 342, 442 of the second ring 14, 214, 314, 414 relative to the central axis 11, 311, and the second radial extreme 50C, 350C, 450C, located axially between and radially spaced apart from the forward end 42, 242, 342, 442 of the second ring 14, 214, 314, 414 and the aft end 44, 244, 344, 444 of the second ring 14, 214, 314, 414 relative to the central axis 11, 311.

The method includes coupling the first ring 12, 212, 312, 412 and the second ring 14, 214, 314, 414 together with the strut 66, 266A, 266B, 366, 466 that extends radially between and interconnects the first ring 12, 212, 312, 412 and the second ring 14, 214, 314, 414. The second radial extreme 50C of the second ring 14 extends radially away from the forward end 42 and the aft end 44 of the second ring 14 and toward the first ring 12 such that the second radial extreme 50C is tangential to or extends radially beyond an imaginary surface 58 that extends, at a constant slope, axially between and interconnects the forward end 22 and the aft end 24 of the first ring 12. The second radial extreme 50C is located radially between a radius of the forward end 22, 222 of the first ring 12, 212 and a radius of the aft end 24, 224 of the first ring 12, 212.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An infrared suppressor adapted for use with a gas turbine engine, the infrared suppressor comprising:
    a first ring arranged circumferentially around an axis, the first ring having a forward end of the first ring, an aft end of the first ring that is spaced apart axially from the forward end of the first ring relative to the axis, and a first radial extreme located axially between the forward end of the first ring and the aft end of the first ring relative to the axis,
    a second ring arranged circumferentially around the axis and aligned axially with the first ring, the second ring having a forward end of the second ring, an aft end of the second ring that is spaced apart axially from the forward end of the second ring relative to the axis, and a second radial extreme located axially between the forward end of the second ring and the aft end of the second ring relative to the axis, and
    a third ring arranged circumferentially around the axis and aligned axially with the first ring and the second ring, the third ring having a forward end of the third ring, an aft end of the third ring that is spaced apart axially from the forward end of the third ring relative to the axis, and a third radial extreme located axially between the forward end of the third ring and the aft end of the third ring relative to the axis,
    wherein the second radial extreme of the second ring extends radially away from the forward end and the aft end of the second ring and toward the first ring such that the forward end of the first ring, the aft end of the first ring, and the second radial extreme cooperate to block line-of-sight between the first ring and the second ring for all angles of view when looking axially forward at the infrared suppressor,
    wherein the third radial extreme of the third ring extends radially away from the forward end and the aft end of the third ring and toward the second ring such that the forward end of the second ring, the aft end of the second ring, and the third radial extreme cooperate to block line-of-sight between the second ring and the third ring for all angles of view when looking axially forward at the infrared suppressor,
    further comprising a first strut that extends radially between and interconnects the first ring and the second ring, and the first strut extends radially at a canted angle relative to the axis such that the canted angle does not intersect the axis.

2. The infrared suppressor of claim 1, wherein the first ring is located radially outward of the second ring, the second radial extreme is a radial maximum height of the second ring, and the third radial extreme is a radial maximum height of the third ring.

3. The infrared suppressor of claim 1, wherein the second ring is located radially outward of the first ring, the second radial extreme is a radial minimum height of the second ring, and the third radial extreme is a radial minimum height of the third ring.

4. The infrared suppressor of claim 1, wherein the second radial extreme is tangential to or extends radially beyond a first imaginary surface that extends, at a constant slope, axially between and interconnects the forward end and the aft end of the first ring.

5. The infrared suppressor of claim 4, wherein the third radial extreme is tangential to or extends radially beyond a second imaginary surface that extends, at a constant slope, axially between and interconnects the forward end and the aft end of the second ring.

6. The infrared suppressor of claim 1, wherein the aft end of the second ring terminates in axially alignment with the aft end of the third ring.

7. The infrared suppressor of claim 6, wherein the aft end of the first ring terminates forward of the aft end of the second ring.

8. An infrared suppressor adapted for use with a gas turbine engine, the infrared suppressor comprising:
    a first ring arranged circumferentially around an axis, a second ring located radially outward of the first ring and arranged circumferentially around the first ring, and a third ring located radially outward of the second ring and arranged circumferentially around the second ring, a first portion of the first ring extends radially outward toward the second ring such that the first portion is tangent to or extends radially outward beyond and intersects a first imaginary line connecting two points on the second ring, and a second portion of the second ring extends radially outward toward the third ring such that the second portion is tangent to or extends radially outward beyond and intersects a second imaginary line connecting two points on the third ring, further comprising a first strut that extends radially between and interconnects the first ring and the second ring and a second strut that extends radially between and interconnects the second ring and the third ring, wherein the first strut is offset circumferentially from the second strut such that no strut extending between the second ring and the third ring is aligned circumferentially with the first strut and no strut extending between the first ring and the second intermediate ring is aligned circumferentially with the second strut.

9. The infrared suppressor of claim 8, wherein the first portion of the first ring is a radial maximum of the first ring and the second portion of the second ring a radial maximum of the second ring.

10. The infrared suppressor of claim 9, wherein the first portion of the first ring is spaced apart axially from a first end and a second end of the first ring and the second portion of the second ring is spaced apart axially from a first end and a second end of the second ring.

11. The infrared suppressor of claim 8, wherein the second ring is formed to define an annular cooling cavity therein, and the first strut and the second strut define a cooling passages that extends radially into the first strut and the second strut and are fluidly connected with the annular cooling cavity of the second ring.

12. The infrared suppressor of claim 11, wherein the second ring includes a radial outer surface formed with first cooling holes in fluid communication with the annular cooling cavity and a radial inner surface formed with second cooling holes in fluid communication with the annular cooling cavity.

13. The infrared suppressor of claim 8, wherein the first ring includes a forward end, an aft end that is spaced apart axially from the forward end of the first ring relative to the axis, and the first portion is located axially between and radially spaced apart from the forward end of the first ring and the aft end of the first ring relative to the axis, and the second ring includes a forward end, an aft end that is spaced apart axially from the forward end of the second ring relative to the axis, and the second portion is located axially between and radially spaced apart from the forward end of the second ring and the aft end of the second ring relative to the axis.

14. A method of providing an infrared suppressor, the method comprising:

forming a first ring circumferentially around an axis, forming a second ring circumferentially around the first ring and aligned axially with the first ring, wherein a first portion of the first ring extends radially outward toward the second ring such that the first portion is tangent to or extends radially outward beyond and intersects a first imaginary line connecting two points on the second ring, and forming a third ring circumferentially around the second ring and aligned axially with the second ring, wherein a second portion of the second ring extends radially outward toward the third ring such that the second portion is tangent to or extends radially outward beyond and intersects a second imaginary line connecting two points on the third ring, wherein the first ring includes a forward end, an aft end that is spaced apart axially from the forward end of the first ring relative to the axis, and the first portion is located axially between and radially spaced apart from the forward end of the first ring and the aft end of the first ring relative to the axis, and the second ring includes a forward end, an aft end that is spaced apart axially from the forward end of the second ring relative to the axis, and the second portion is located axially between and radially spaced apart from the forward end of the second ring and the aft end of the second ring relative to the axis, and coupling the first ring and the second ring together with a strut that extends radially between and interconnects the first ring and the second ring and the strut extends radially at a canted angle relative to the axis such that the canted angle does not intersect the axis.

* * * * *